US012492309B2

(12) United States Patent
Young

(10) Patent No.: US 12,492,309 B2
(45) Date of Patent: Dec. 9, 2025

(54) SPECTRALLY SELECTIVE ZINC OXIDE PARTICLES AND METHODS OF MAKING THEREOF

(71) Applicant: University of South Florida, Tampa, FL (US)

(72) Inventor: David Allen Young, Tampa, FL (US)

(73) Assignee: University of South Florida, Tampa, FL (US)

( * ) Notice: Subject to any disclaimer, the term of this patent is extended or adjusted under 35 U.S.C. 154(b) by 284 days.

(21) Appl. No.: 18/321,479

(22) Filed: May 22, 2023

(65) Prior Publication Data
US 2023/0374313 A1 Nov. 23, 2023

Related U.S. Application Data

(60) Provisional application No. 63/365,058, filed on May 20, 2022.

(51) Int. Cl.
*C09D 5/33* (2006.01)
*C01G 9/02* (2006.01)
(Continued)

(52) U.S. Cl.
CPC ............ *C09D 5/004* (2013.01); *C01G 9/02* (2013.01); *C09D 7/62* (2018.01); *G02B 5/206* (2013.01);
(Continued)

(58) Field of Classification Search
CPC . C09D 5/004; C09D 7/62; C09D 1/00; C09D 7/61; C01G 9/02; G02B 5/206;
(Continued)

(56) References Cited

U.S. PATENT DOCUMENTS 4,323,619 A 4/1982 Silvestrini et al.
8,182,786 B2 * 5/2012 O'Brien ................ A61Q 19/08
423/632

(Continued)

FOREIGN PATENT DOCUMENTS

CN 109225236 A * 1/2019 ............ B01J 37/343
WO WO-2009080427 A1 * 7/2009 ............... C09C 3/08
(Continued)

OTHER PUBLICATIONS

Hydrothermal Preparation of Silver Doping ZO nanoparticles Study and Characterization and Photocatlytic Activity vol. 34 No. 4 (Year: 2018).*
(Continued)

*Primary Examiner* — Pamela H Weiss
(74) *Attorney, Agent, or Firm* — Meunier Carlin & Curfman LLC

(57) ABSTRACT

Disclosed are methods of forming a method for forming spectrally selective nanoparticles, the method comprising: heating a growth solution comprising a zinc salt precursor, zinc oxide seed particles, and one or more dopants in a non-pressurized hydrothermal reactor to a first temperature under agitative conditions for a reaction period; cooling the reactor to a second temperature less than the first temperature for a cooling period to form a precipitate of recrystallized doped zinc oxide nanoparticles dispersed in a suspension; and separating and collecting the recrystallized nanoparticles from the suspension, wherein the collected nanoparticles exhibit a spectral selectivity in the atmospheric window; and, also disclosed herein are comprising a population of polycrystalline zinc oxide nanoparticles doped with one or more dopants, wherein the population of nanoparticles is spectrally selective in the atmospheric window.

6 Claims, 16 Drawing Sheets

(51) Int. Cl.
    C08K 3/22      (2006.01)
    C09D 7/62      (2018.01)
    G02B 5/20      (2006.01)
(52) U.S. Cl.
    CPC ...... C01P 2002/52 (2013.01); C01P 2002/72
        (2013.01); C01P 2002/82 (2013.01); C01P
        2004/03 (2013.01); C01P 2004/04 (2013.01);
        C01P 2004/62 (2013.01); C01P 2004/64
        (2013.01); C08K 2003/2296 (2013.01); C08K
        2201/005 (2013.01); C08K 2201/011
        (2013.01); G02B 2207/101 (2013.01)
(58) Field of Classification Search
    CPC .......... G02B 2207/101; C01P 2002/52; C01P
        2002/72; C01P 2002/82; C01P 2004/03;
        C01P 2004/04; C01P 2004/62; C01P
        2004/64; C08K 2003/2296; C08K
        2201/005; C08K 2201/011
    See application file for complete search history.

(56)            References Cited

U.S. PATENT DOCUMENTS

| | | | |
|---|---|---|---|
| 10,386,097 B2 | 8/2019 | Yu et al. | |
| 2009/0297626 A1* | 12/2009 | O'Brien | C01G 9/02 977/773 |
| 2012/0064314 A1* | 3/2012 | Sekiwa | C09K 11/54 117/64 |
| 2012/0164434 A1* | 6/2012 | Ramadas | H05B 33/04 977/890 |
| 2015/0372191 A1* | 12/2015 | Watanabe | H10H 20/81 257/43 |
| 2021/0131708 A1 | 5/2021 | Dai et al. | |

FOREIGN PATENT DOCUMENTS

| | | | | |
|---|---|---|---|---|
| WO | WO-2015018328 A1 | * | 2/2015 | ............. C01G 39/02 |
| WO | WO-2016050277 A1 | * | 4/2016 | ............. C09C 1/043 |
| WO | WO-2016160790 A1 | * | 10/2016 | ............. C01G 39/02 |

OTHER PUBLICATIONS

Low cost Zinc Oxide Films for High Performance Rigid and Flexible Optoelectronic Devices Mourad Bentamri (Thesis) (Year: 2019).*
Properties of SiO2SicN4 as gate dielectricts for Zno transistors J Vac Sci Technical B29 A01A601 (Year: 2011).*
Zinc Oxide Structure Properties Method of Obtaining Significane in Ecohlogical Catalysis Ivenenko Fedenko Yu Stepanova Byts UDS 549.516.22 (Year: 2022).*
Freestanding Silver Doped Zinc Oxide 2D crystals ssynth. Surface Energy Controlled Hydrothermal Strategy Appl Nano Mater 2021 4, 10534-10544 by Pradhan Bandyopadhyay Nayak Kumar (Year: 2021).*
Dispersion and surface functionalization of oxide nanoparticles for transparent photocatalytic and UV-protecting coatings and sunscreens. Faure B, Salazar-Alvarez G, Ahniyaz A, Villaluenga I, Berriozabal G, De Miguel YR, Bergström L. Sci Technol Adv Mater. Apr. 2, 20136;14(2) (Year: 2013).*
CN 109225236A Translation (Year: 2019).*
WO 2015018328A1 Translation (Year: 2015).*
Al-Obaidi et al., "Passive cooling techniques through reflective and radiative roofs in tropical houses in Southeast Asia: A literature review." Frontiers of Architectural Research 3.3 (2014): 283-297.
ASTM International, "Standard Tables for Reference Solar Spectral Irradiances: Direct Normal and Hemispherical on 37° Tilted Surface." ASTM G173-03(2020): 1-21.
Bao et al., "Double-layer nanoparticle-based coatings for efficient terrestrial radiative cooling." Solar Energy Materials and Solar Cells 168 (2017): 78-84.

Bharat et al., "Synthesis of doped zinc oxide nanoparticles: a review." Materials Today: Proceedings 11 (2019): 767-775.
Bhatia et al., "Passive directional sub-ambient daytime radiative cooling." Nature communications, 9(1), (2018): 1-8.
Catalanotti et al., "The radiative cooling of selective surfaces." Solar Energy 17.2 (1975): 83-89.
Chae et al., "Spectrally selective nanoparticle mixture coating for passive daytime radiative cooling." ACS Applied Materials & Interfaces 13.18 (2021): 21119-21126.
Chen et al., "Radiative cooling to deep sub-freezing temperatures through a 24-h day-night cycle." Nature communications, 7(1), (2016): 1-5.
Coates, "Interpretation of infrared spectra, a practical approach." Encyclopedia of Analytical Chemistry, John Wiley & Sons (2000): 1-24.
Ko, Byoungsu, et al. "Metamaterial-based radiative cooling: towards energy-free all-day cooling." Energies 12.1 (2018): 89.
Peoples et al., "A strategy of hierarchical particle sizes in nanoparticle composite for enhancing solar reflection." International Journal of Heat and Mass Transfer 131 (2019): 487-494.
Dobson et al., "Thin semiconductor films for radiative cooling applications." Solar energy materials and solar cells 80.3 (2003): 283-296.
Firestone Building Products Company, Llc., "Gaco a brand of firestone building products." gaco.com/documents/#sds (accessed Sep. 18, 2021).
Gentle et al., "A subambient open roof surface under the Mid-Summer sun." Advanced Science 2.9 (2015): 1-4.
Gentle et al., "Radiative heat pumping from the earth using surface phonon resonant nanoparticles." Nano letters 10.2 (2010): 373-379.
Gonome et al., "Control of thermal barrier performance by optimized nanoparticle size and experimental evaluation using a solar simulator." Journal of Quantitative Spectroscopy and Radiative Transfer 149 (2014): 81-89.
Oke, "Urban climate and global environmental change." Applied climatology (1997): 273-287.
Grand View Research, "Cool Roof Coatings Market Size, Share & Trends Analysis Report by End Use, by Product (Elastomeric, IR Reflective), By Application (Lowsloped, Steep-sloped), And Segment Forecasts, 2020-2027." www.grandviewresearch.com/industry-analysis/cool-roof-coating-market (accessed Sep. 22, 2021), (2020), 140 pages.
Granqvist et al., "Radiative cooling to low temperatures: General considerations and application to selectively emitting SiO films." Journal of Applied Physics 52.6 (1981): 4205-4220.
Hu et al., "Theoretical and experimental study of spectral selectivity surface for both solar heating and radiative cooling." International journal of photoenergy 2015 (2015): 1-10.
Huang et al., "Nanoparticle embedded double-layer coating for daytime radiative cooling." International journal of heat and mass transfer 104 (2017): 890-896.
Raman et al., "Passive radiative cooling below ambient air temperature under direct sunlight." Nature 515.7528 (2014): 540-544.
Janotti et al., "Fundamentals of zinc oxide as a semiconductor." Reports on progress in physics 72.12 (2009): 126501, 1-30.
Johnson et al., "A multiple-scattering model analysis of zinc oxide pigment for spacecraft thermal control coatings." Progress in organic coatings 47.3-4 (2003): 432-442.
Kecebas et al., "Passive radiative cooling design with broadband optical thin-film filters." Journal of Quantitative Spectroscopy and Radiative Transfer 198 (2017): 1-17.
Patterson, "The Scherrer formula for X-ray particle size determination." Physical review 56.10 (1939): 978-982.
Kolokotsa et al., "Advances in the development of cool materials for the built environment." Bentham Science Publishers (2013) 1-.396.
Lamba et al., "Thermal modeling of a building integrated radiative cooler for space cooling applications." ASME International Mechanical Engineering Congress and Exposition. vol. 52071. American Society of Mechanical Engineers (2018).
Lany, "Semiconducting transition metal oxides." Journal of Physics: Condensed Matter 27.28 (2015): 283203, 1-38.
Lee, "Climate Algorithm Theoretical Basis Document (C-ATBD): Outgoing Longwave Radiation (OLR)-Daily. NOAA's Climate

(56) References Cited

OTHER PUBLICATIONS

Data Record (CDR) Program" psl.noaa.gov/data/gridded/data.olrcdr.interp.html (accessed Oct. 11, 2021), CDR-ATBD-0526 111 (2014): 2804-2822.
Li et al., "Atmospheric-Window-Matching hierarchical Broadband infrared absorber realized by lithography-Free Fabrication." Frontiers in Energy Research 6 (2018): 20, 1-6.
Li et al., "Full daytime sub-ambient radiative cooling in commercial-like paints with high figure of merit." Cell Reports Physical Science 1.10 (2020): 1-13.
Ling et al., "Doped semiconductor nanoparticles for possible daytime radiative cooling applications." Semiconductor Science and Technology 35.7 (2020): 075018.
Liu et al., "Heavily-doped colloidal semiconductor and metal oxide nanocrystals: an emerging new class of plasmonic nanomaterials." Chemical Society Reviews 43.11 (2014): 1-14.
Makarona et al., "A cost-efficient solution-based process for the development of ZnO nanostructures: a comprehensive study of the role of the seeding layer formation conditions." Procedia engineering 120 (2015): 447-450.
Mandal et al., "Hierarchically porous polymer coatings for highly efficient passive daytime radiative cooling." Science 362.6412 (2018): 1-9.
Masson-Delmotte et al., "Climate change 2021: the physical science basis." Contribution of working group I to the sixth assessment report of the intergovernmental panel on climate change. (2021): 1-16.
Munday, "Tackling climate change through radiative cooling." Joule 3.9 (2019): 2057-2060.
Muselli, "Passive cooling for air-conditioning energy savings with new radiative low-cost coatings." Energy and Buildings 42.6 (2010): 945-954.
Naghshine et al., "Optimized thin film coatings for passive radiative cooling applications." Optics Communications 410 (2018): 416-423.
Nakamoto, "Infrared and Raman spectra of inorganic and coordination compounds, part B: applications in coordination, organometallic, and bioinorganic chemistry." John Wiley & Sons (2009): 1-67.
NASA, "Solar Radiation". Nasa, earth.gsfc.nasa.gov/climate/research/solar-radiation /(accessed Oct. 11, 2021) Jul. 29, 2021.
Nilsson et al., "Radiative cooling during the day: simulations and experiments on pigmented polyethylene cover foils." Solar energy materials and solar cells 37.1 (1995): 93-118.
Stephens et al., "An update on Earth's energy balance in light of the latest global observations." Nature Geoscience 5.10 (2012): 691-696.
Kang, Hongjun, et al. "Keep cool: polyhedral ZnO@ ZIF-8 polymer coatings for daytime radiative cooling." Industrial & Engineering Chemistry Research 59.34 (2020): 15226-15232.
Stuart, "Infrared spectroscopy: fundamentals and applications." John Wiley & Sons (2004): 1-108.
Turko et al., "Thermal conductivity of zinc oxide micro-and nanocomposites." Journal of Nano- and Electronic Physics (2016): 02004-1-02004-4.
U.S. Department of Energy, "Cool roofs are ready to save energy, cool urban heat islands, and help slow global warming." U.S. Department of Energy, www1.eere.energy.gov/buildings/pdfs/cool_roof_fact_sheet.pdf (accessed Sep. 22, 2021), (2021); 1-2.
Wang, "Zinc oxide nanostructures: growth, properties and applications." Journal of physics: condensed matter 16.25 (2004): R829-R858.
Wijewardane et al., "A review on surface control of thermal radiation by paints and coatings for new energy applications." Renewable and Sustainable Energy Reviews 16.4 (2012): 1863-1873.
Wiley, "John Wiley & Sons, Inc." SpectraBase: spectrabase.com/spectrum/ (accessed Sep. 18, 2021), (2012): 1-34.
Young, "Passive Radiative Cooling by Spectrally Selective Nanoparticles in Thick Film Nanocomposites." Dissertation, University of South Florida (2022): 1-125.
Zevenhoven et al., "Radiative cooling through the atmospheric window: A third, less intrusive geoengineering approach." Energy 152 (2018): 1-18.
Zeyghami et al., "A review of clear sky radiative cooling developments and applications in renewable power systems and passive building cooling." Solar Energy Materials and Solar Cells 178 (2018): 115-128.
Zhai et al., "Scalable-manufactured randomized glass-polymer hybrid metamaterial for daytime radiative cooling." Science 355.6329 (2017): 1062-1066.
Zhao et al., "Comprehensive photonic approach for diurnal photovoltaic and nocturnal radiative cooling." Solar Energy Materials and Solar Cells 178 (2018): 266-272.
Zhou et al., "Aluminum-doped zinc oxide nanoparticles with tunable near-infrared absorption/reflectance by a simple solvothermal process." RSC Advances 4.81 (2014): 7-16.
Zhu et al., "Radiative cooling of solar absorbers using a visibly transparent photonic crystal thermal blackbody." Proceedings of the national academy of sciences 112.40 (2015): 12282-12287.
Zhao, Dongliang, et al. "Radiative sky cooling: Fundamental principles, materials, and applications." Applied Physics Reviews 6.2 (2019).

* cited by examiner

SPECTRALLY SELECTIVE ZINC OXIDE PARTICLES AND METHODS OF MAKING THEREOF

RELATED APPLICATION

This U.S. non-provisional application claims priority to, and the benefit of, U.S. Provisional Patent Application No. 63/365,058, filed May 20, 2022, which is incorporated by reference herein in its entirety.

BACKGROUND

In recent decades, the growing concentration of carbon dioxide in the air has increased the atmospheric retention of thermal energy. This warming effect is especially felt in urban areas, where modern urban areas with populations of more than 1 million people are termed "heat islands" by the US Environmental Protection Agency (EPA) because the annual mean air temperature can be 1-3° C. hotter than surrounding rural areas. Heat islands increase peak cooling loads, air conditioning costs, air pollution, greenhouse gas emissions, heat-related illness/mortality, and even water pollution. In developed countries, over 50% of urban surface areas are either roofs or paved surfaces.

Surfaces exposed to incoming solar irradiance are prime locations for day and night passive radiative cooling technology. Radiative coolers passively cool terrestrial objects by selectively emitting heat through the earth's atmospheric window to the cold of outer space while reflecting electromagnetic radiation outside the atmospheric window. This thermal management technique can passively cool a structure without the need for energy-invasive cooling devices (e.g., air conditioners), thereby reducing the demand for external energy sources. For example, Catalanotti et al. (1975) demonstrated that a 12.5 μm thick TEDLAR® (polyvinyl-fluoride plastic) film on top of an aluminum substrate through passive radiative cooling could drop surface temperatures 12° C. below ambient temperature at night, reducing the "heat island" effect.

More recently, several commercial products have emerged as potential radiative coolers. However, many of these radiative cooling products are spectrally indiscriminate, thereby limiting their effectiveness for radiative cooling during the daytime. Furthermore, these cooling methods often require expensive nanoscale precision instrumentation for uniform multi-layer thin films or nanostructures in a controlled environment, which is currently not feasible for large-scale applications.

SUMMARY

Disclosed herein are compounds, compositions, methods for making and using such compounds, and compositions.

The exemplary methods provide a low-cost, scalable, and tunable process for forming spectrally selective doped zinc oxide nanoparticles. The process can operate under low-temperature and low-pressure conditions, allowing for an economical synthesis of doped zinc oxide nanoparticles.

For example, the doped zinc oxide nanoparticles can be tuned for high emissivity within the atmospheric window to offer greater cooling power compared to conventional radiative cooling technologies. Doped zinc oxide nanocrystals according to the present disclosure can be utilized in a variety of applications, such as materials for passive radiative cooling, Thermal Control Coating (TCC), and photovoltaic devices. The presently disclosed compositions can further exhibit improved durability over existing technology.

In various aspects, disclosed herein are methods of forming spectrally selective nanoparticles, the method comprising: heating a growth solution comprising a zinc salt precursor, zinc oxide seed particles, and one or more dopants in a non-pressurized (e.g., 2 atm or less) hydrothermal reactor to a first temperature under agitative conditions for a reaction period; cooling the reactor to a second temperature less than the first temperature for a cooling period to form a precipitate of recrystallized doped zinc oxide nanoparticles dispersed in a suspension; and separating and collecting the recrystallized nanoparticles from the suspension, wherein the collected nanoparticles (e.g., nanocrystals) exhibit a spectral selectivity in the atmospheric window (e.g., from 8 μm to 13 μm).

In some aspects, the zinc salt precursor comprises one or more zinc salts. In various examples, the one or more zinc salts include zinc acetate, zinc nitrate hexahydrate, or a combination thereof.

In various aspects, the growth solution further comprises a surfactant (e.g., hexamethylenetetramine (HMTA), sodium dodecyl sulfate (SDS), and/or sodium lauryl sulfate (SLS)).

In some aspects, the one or more dopants is chosen from $Ag_2O$, $Al_2O_3$, $CaCO_3$, $Cu_2O$, $MgO$, $SiC$, $SiO$, $SiO_2$, $SiO_4$, $Si_3N_4$, $SnO_2$, $TiO_2$, $Fe_3O_4$, $VO_2$, $SnO$, $CeO$, and combinations thereof. In various examples, the growth solution includes two or more dopants. In some aspects, at least one of the two or more dopants comprises a noble metal. In some aspects, the two or more dopants comprise $Si_3N_4$ and $SiO_2$. In some aspects, the zinc oxide seed particles comprise zinc oxide powder. In some aspects, the zinc oxide seed particles comprise doped zinc oxide nanoparticles. In some aspects, the zinc oxide powder has an average particle size of from 25 nm to 200 nm (e.g., from 50 nm to 100 nm).

In some aspects, the nanoparticles are substantially polydisperse. In some aspects, the nanoparticles are substantially polymorphic and/or substantially polycrystalline. In some aspects, the first temperature and the second temperature are both 200° C. or less (e.g., 190° C. or less, 180° C. or less, 170° C. or less, 160° C. or less, 150° C. or less, 140° C. or less, 130° C. or less, 120° C. or less, 110° C. or less, 100° C. or less, 90° C. or less, 80° C. or less, or 70° C. or less).

In some aspects, the step of separating and collecting the doped zinc oxide nanoparticles comprises decanting the solution, washing the precipitated doped zinc oxide nanoparticles at least once (e.g., using deionized (DI) water), and substantially drying the doped zinc oxide nanoparticles.

In some aspects, the agitative conditions comprise continuous mechanical stirring. For example, in various aspects, the zinc oxide seed particles are continually suspended in the growth solution for substantially the entire reaction period.

In another aspect, the present disclosure relates to a composition comprising: a population of polycrystalline zinc oxide nanoparticles (e.g., nanocrystals) doped with one or more dopants, wherein the population of nanoparticles is spectrally selective in the atmospheric window (e.g., from 8 μm to 13 μm).

In some aspects, the one or more dopants is selected from the group consisting of $Ag_2O$, $Al_2O_3$, $CaCO_3$, $Cu_2O$, $MgO$, $SiC$, $SiO$, $SiO_2$, $SiO_4$, $Si_3N_4$, $SnO_2$, $TiO_2$, $Fe_3O_4$, $VO_2$, $SnO$, $CeO$, and combinations thereof.

In some aspects, the one or more dopants comprise two or more dopants. For example, various aspects include wherein at least one of the two or more dopants comprises a noble metal (e.g., a noble metal oxide and/or a noble metal nitride). In some examples, the two or more dopants include $Si_3N_4$ and $SiO_2$.

In some examples, the composition comprising the population of nanoparticles is included in a cooling coating (e.g., a thermal control coating (TCC)) to assist with heat dissipation.

In another aspect, the present disclosure relates to a nanocomposite comprising: a substrate comprising one or more layers deposited thereon, wherein at least one of the one or more layers comprises a radiative cooling layer comprising doped zinc oxide nanoparticles (e.g., nanocrystals) are spectrally selective in the atmospheric window (e.g., from 8 µm to 13 µm).

In various aspects, the substrate comprises aluminum, silver, an alloy thereof, or a combination thereof.

In various aspects, the one or more dopants is selected from the group consisting of $Ag_2O$, $Al_2O_3$, $CaCO_3$, $Cu_2O$, $MgO$, $SiC$, $SiO$, $SiO_2$, $SiO_4$, $Si_3N_4$, $SnO_2$, $TiO_2$, $Fe_3O_4$, $VO_2$, $SnO$, $CeO$, and combinations thereof.

In various aspects, the doped zinc oxide nanoparticles are coupled to a surface of the substrate (e.g., using aerosol spraying and/or chemical solution deposition).

In various aspects, the doped zinc oxide nanoparticles comprise a noble metal dopant configured to provide an enhanced plasmonic effect.

In various aspects, the nanoparticles are substantially polydisperse.

In various aspects, the nanoparticles are substantially polymorphic and/or substantially polycrystalline.

In various aspects, the nanoparticles comprise a volume fraction of the radiative cooling layer of from 3% to 10%.

In various aspects, the radiative cooling layer has a thickness of from 40-300 µm.

In various aspects, the radiative cooling layer comprises a filler (e.g., SiO) having the doped zinc oxide nanoparticles randomly distributed therein.

In various aspects, the radiative cooling layer is configured to exhibit a radiative cooling power of 15 $W/m^2$ or more (e.g., 20 $W/m^2$ or more, 25 $W/m^2$ or more, 30 $W/m^2$ or more, 35 $W/m^2$ or more, 40 $W/m^2$ or more, 45 $W/m^2$ or more, 50 $W/m^2$ or more, 55 $W/m^2$ or more, 60 $W/m^2$ or more, 65 $W/m^2$ or more, 70 $W/m^2$ or more, 75 $W/m^2$ or more, 80 $W/m^2$ or more, 85 $W/m^2$ or more, 90 $W/m^2$ or more, 95 $W/m^2$ or more, 100 $W/m^2$ or more).

In various aspects, the nanocomposite further includes one or more polymer layers. Additional advantages of the disclosed subject matter will be set forth in part in the description that follows and the Figures, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

(FIG. 14A) Spherical doped ZnO (FIG. 14B) Hexagonal pure ZnO (FIG. 14C) Nanorods doped ZnO RC 33 (FIG. 14D) Multiple size doped ZnO RC 32.

(FIG. 15A) RC 41 nanoneedle and nanosheet double dopant ZnO (FIG. 15B) RC 33 nanorods doped ZnO (FIG. 15C) RC 36 multiple morphology and size doped ZnO (FIG. 15D) RC 40 nanosheets with a lot of agglomeration (FIG. 15E) RC 37 multiple size doped ZnO.

(FIG. 16A) One-step ink layer (FIG. 16B) Two-step ink layer (FIG. 16C) Spectrally selective particles adhering to binder coating on the substrate surface (FIG. 16D) One-step paste layer (FIG. 16E) Multi-layer.

(FIG. 18A) Surface morphology of CSD of solvent and nanoparticle mixture with spray coated binding layer (FIG. 18B) Surface of 47 μm thick film nanocomposite ink layer shows random dispersion of spectrally selective nanoparticles in siloxane binder (FIG. 18C) Magnification of thick film nanocomposite ink layer's spectrally selective nanoparticles, size range 4—6 μm (FIG. 18D) Surface morphology of paste layer with SiO filler and doped ZnO nanoparticles, size range 4—8 μm (T18) in 65 μm thick film.

DETAILED DESCRIPTION

Figure 1:
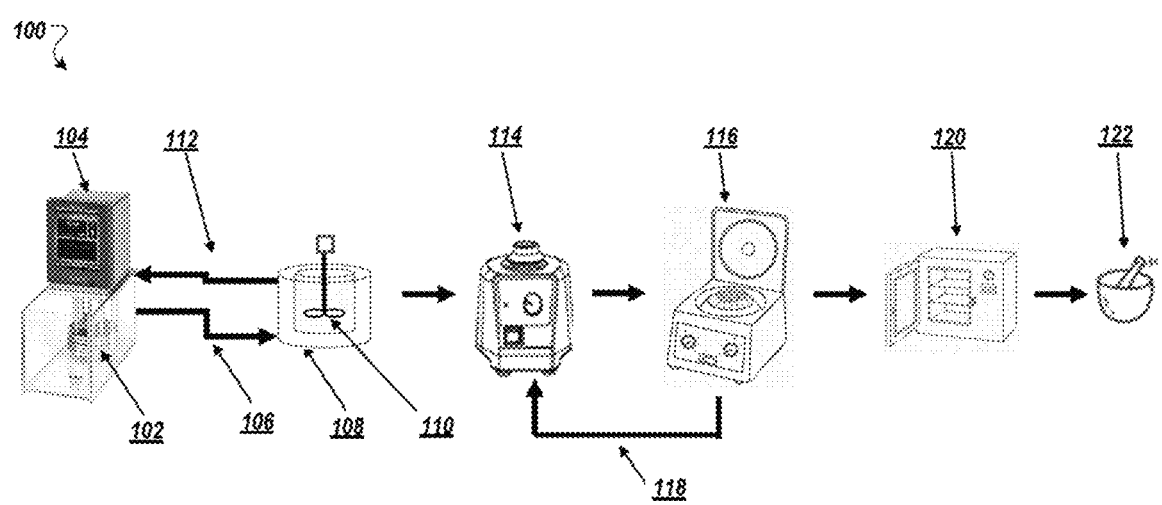
FIG. 1 shows an exemplary diagram of a hydrothermal synthesis process setup according to one aspect of the present disclosure.

The materials, compounds, compositions, articles, and methods described herein may be understood more readily by reference to the following detailed description of specific aspects of the disclosed subject matter and the Examples and Figures included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

As used herein, the term "nanoparticle" refers to particles having an diameter ranging from a lower limit of 0.5 nm, 1 nm, 5 nm, 10 nm, 25 nm, 50 nm, 100 nm, or 250 nm to an upper limit of 500 nm, 400 nm, 300 nm, 250 nm, 100 nm, 50 nm, 25 nm, or 10 nm, wherein the diameter may range from any lower limit to any upper limit to the extent that the selected range encompasses any subset between the upper and lower limits. It should be understood that the term "nanoparticle" includes all known shapes including, but not limited to, a sphere; a rod with a high to low aspect ratio; a wire; a star, a tetrapod or any other multi-legged shape; and a substantially spherical shape which may include an ovoid or a rice shape. Specific reference to "polymorphic nanoparticles" refers to a population of nanoparticles comprising a number of different shapes.

As used herein, the term "crystalline" means any material comprising a crystal structure, including, for example, single crystal and polycrystalline semiconducting materials. The term "polycrystalline" refers to a material comprising a plurality of grains or crystals of the material, which grains are bonded directly together by inter-granular bonds. The crystal structures of the individual grains of the material may be randomly oriented in space within the polycrystalline material.

The term "emissivity" as used herein refers to the ratio of a radiant quantity from a black body to a radiant quantity from a sample at the same temperature.

As used herein, the term "spectrally selective" refers to a material that exhibits a larger average absorptivity/emissivity over a particular range of wavelengths compared to wavelengths outside the range. Solar radiation incident upon a terrestrial surface may be partially absorbed, reflected, or transmitted. According to the First Law of Thermodynamics the sum of the fractional components of absorption (a), reflection (p), and transmission (τ) equal to one [32].

$$a+\rho+\tau=1$$

Spectrally selective materials modify the absorption, reflection, and transmission of electromagnetic radiation upon its surface. Passive radiative cooling from emission through the atmospheric window requires selective absorption. Kirchhoff's law states that spectral absorptivity and spectral emissivity of an object in thermal equilibrium are equal, for every wavelength and direction. The function for a body with a spectral and angular emissivity $\varepsilon(\lambda, \theta)$ of radiation has the absorptivity (a) of a body equal its emissivity (c) at every wavelength (λ) [32]:

$$\varepsilon\lambda(\lambda,\theta)=\alpha\lambda(\lambda,\theta)$$

For example, a "spectrally selective material" can exhibit an average absorptivity/emissivity of from 0.05 or more (e.g., 0.10 or more, 0.15 or more, 0.20 or more, 0.25 or more, 0.30 or more, 0.35 or more, 0.40 or more, 0.45 or more, 0.50 or more, 0.55 or more, 0.60 or more, 0.65 or more, 0.70 or more, 0.75 or more, 0.80 or more, 0.85 or more, or 0.90 or more) over a particular range of wavelengths (e.g., the atmospheric window or from 8-13 μm). In some aspects, the spectrally selective material can also exhibit a large average reflectivity (i.e., low absorptivity) for wavelengths outside the particular wavelength range. For example, the spectrally selective material can also exhibit an average absorptivity/emissivity of 0.25 or less (e.g., 0.20 or less, 0.15 or less, 0.10 or less, 0.05 or less, 0.04 or less, 0.03 or less, 0.02 or less, or 0.01 or less) for wavelengths outside of the particle wavelength range.

As used herein, the term "atmospheric window" refers to the window of electromagnetic waves in ranges of 0.7-2.5, 3-5, and 8-14 μm, which exhibit high transmittance through the atmosphere. Within the atmospheric window, the primary atmospheric window includes the 8-13 μm wavelength range which can provide a high degree of transmittance to enhance radiative cooling effect. In some aspects, multiple absorption mechanisms having high absorbance in these windows can be used to increase the radiative cooling results. Whereas the maximum reflectivity of electromagnetic waves in the wavelength ranges of 0.3-0.7, 2.5-3, 5-8, and 15-25 μm will also benefit radiative cooling.

As used herein, the term "dopant" refers to a material, which can be added to a host material (e.g., a nanoparticle), that changes the electronic characteristic(s) or the targeted wavelength(s) of radiation emission, reception, or filtering of the layer compared to the electronic characteristic(s) or the wavelength(s) of radiation emission, reception, or filtering of the host material in the absence of such dopant material.

Reference will now be made in detail to specific aspects of the disclosed materials, compounds, compositions, articles, and methods, examples of which are illustrated in the accompanying Examples and Figures.

Systems and Methods

Disclosed herein are systems and methods for forming spectrally selective zinc oxide nanoparticles. In one aspect, the method includes: heating a growth solution comprising a zinc salt precursor, zinc oxide seed particles, and one or more dopants in a non-pressurized (e.g., 2 atm or less) hydrothermal reactor to a first temperature under agitative conditions for a reaction period; cooling the reactor to a second temperature less than the first temperature for a cooling period to form a precipitate of recrystallized doped zinc oxide nanoparticles dispersed in a suspension; and separating and collecting the recrystallized nanoparticles from the suspension, wherein the collected nanoparticles (e.g., nanocrystals) exhibit a spectral selectivity in the atmospheric window (e.g., from 8 μm to 13 μm).

The present method advantageously utilizes a low-pressure hydrothermal reactor in the synthesis of spectrally selective zinc oxide nanoparticles. The non-pressurized reactor can, for example, operate at a pressure of 5 atm or less, such as 4 atm or less, 3 atm or less, 2 atm or less, or 1 atm or less. Unlike conventional methods using an autoclave, the low-pressure requirements of the present disclosure afford simpler scale-up, thereby making it more cost-effective.

In some aspects, the zinc salt precursor comprises one or more zinc salts. Suitable zinc salts include but are not limited to zinc chloride, zinc nitrate, zinc sulphate, and zinc acetate. In various examples, the one or more zinc salts include zinc acetate, zinc nitrate hexahydrate, or a combination thereof.

In various aspects, the growth solution further comprises a surfactant. The term "surfactant" refers to a molecule having surface activity, including wetting agents, dispersants, emulsifiers, detergents, foaming agents, etc. Non-limiting examples of suitable surfactants include hexamethylenetetramine (HMTA), sodium dodecyl sulfate (SDS), sodium lauryl sulfate (SLS) and combinations thereof.

In some aspects, the one or more dopants is chosen from $Ag_2O$, $Al_2O_3$, $CaCO_3$, $Cu_2O$, MgO, SiC, SiO, $SiO_2$, $SiO_4$, $Si_3N_4$, $SnO_2$, $TiO_2$, $Fe_3O_4$, $VO_2$, SnO, CeO, and combinations thereof. In various examples, the growth solution includes two or more dopants. In some aspects, at least one of the two or more dopants comprises a noble metal. Suitable noble metal dopants include, but are not limited to, platinum, iridium, rhenium, ruthenium, rhodium, palladium, silver, osmium, gold, combinations thereof, and alloys thereof. In some aspects, the two or more dopants comprise $Si_3N_4$ and $SiO_2$. In some aspects, the zinc oxide seed particles comprise zinc oxide powder. In some aspects, the zinc oxide seed particles comprise doped zinc oxide nanoparticles. In some aspects, the zinc oxide powder has an average particle size of from 25 nm to 200 nm (e.g., from 50 nm to 100 nm).

In some aspects, the nanoparticles are substantially polydisperse. The term "polydisperse" refers to a sample containing nanoparticles that include a distribution of various particle sizes. In some aspects, the nanoparticles are substantially polymorphic and/or substantially polycrystalline.

In some aspects, the first temperature and the second temperature are both 200° C. or less (e.g., 190° C. or less, 180° C. or less, 170° C. or less, 160° C. or less, 150° C. or less, 140° C. or less, 130° C. or less, 120° C. or less, 110° C. or less, 100° C. or less, 90° C. or less, 80° C. or less, or 70° C. or less).

In some aspects, the step of separating and collecting the doped zinc oxide nanoparticles comprises decanting the solution, washing the precipitated doped zinc oxide nanoparticles at least once (e.g., using deionized water), and substantially drying the doped zinc oxide nanoparticles. Although the examples and appended Figures depict some illustrative configurations for decanting, washing, and drying, a number of other techniques are known and can be incorporated into the present method by one skilled in the art. For example, the method can include using vortex mixing to blend the contents of a container containing nanocrystal slurry and reaction components diluted in DI water. The vortex mixing can separate the particles from remaining reaction byproducts while maintaining a degree of agglomeration for recrystallization of particles. Unexpectedly, the agglomeration of nanoparticles can contribute to overall spectral selectivity of the resulting nanoparticles.

The term "agitative conditions" refers to conditions of the reactor whereby power may be applied to a mixture to cause mixing of the component of the mixture. Typically there is rotation motion of a mechanism causing the mixing through an agitation device. The agitation device can, in some instances, be coupled with a pumping device that circulates the mixture within the reactor vessel. In some aspects, the agitative conditions comprise continuous mechanical stirring. For example, in various aspects, the zinc oxide seed particles are continually suspended in the growth solution for substantially the entire reaction period. The suspension of the seed particles can act as high surface area nucleation sites which can overcome the limitations of other synthesis methods.

FIG. 1 shows an example schematic diagram of a system 100 for producing spectrally selective zinc oxide nanoparticles according to one aspect of the present disclosure. In the example scheme, the system 100 includes a heated bath circulator 102 and a thermoregulator 104 having temperature controls and a timer. The heated bath circulator 102 and thermoregulator 104 together are configured to monitor and isothermally circulate heated water through a first insulated conduit 106 to the interstitial space surrounding a jacketed reactor vessel 108 (e.g., a beaker). The water is continuously returned to the heated bath circulator 102 through a second insulated conduit 112. The interior of the reactor vessel 108 contains a precursor solution, surfactants, solvents, seed particles and dopants in a non-pressurized environment. The reactor vessel 108 further includes a mechanical stirrer 110 having a timer and temperature gauge. In various aspects, some systems may further utilize a fume hood or distillation apparatus to eliminate or reduce emissions and recover compounds.

Figure 2:
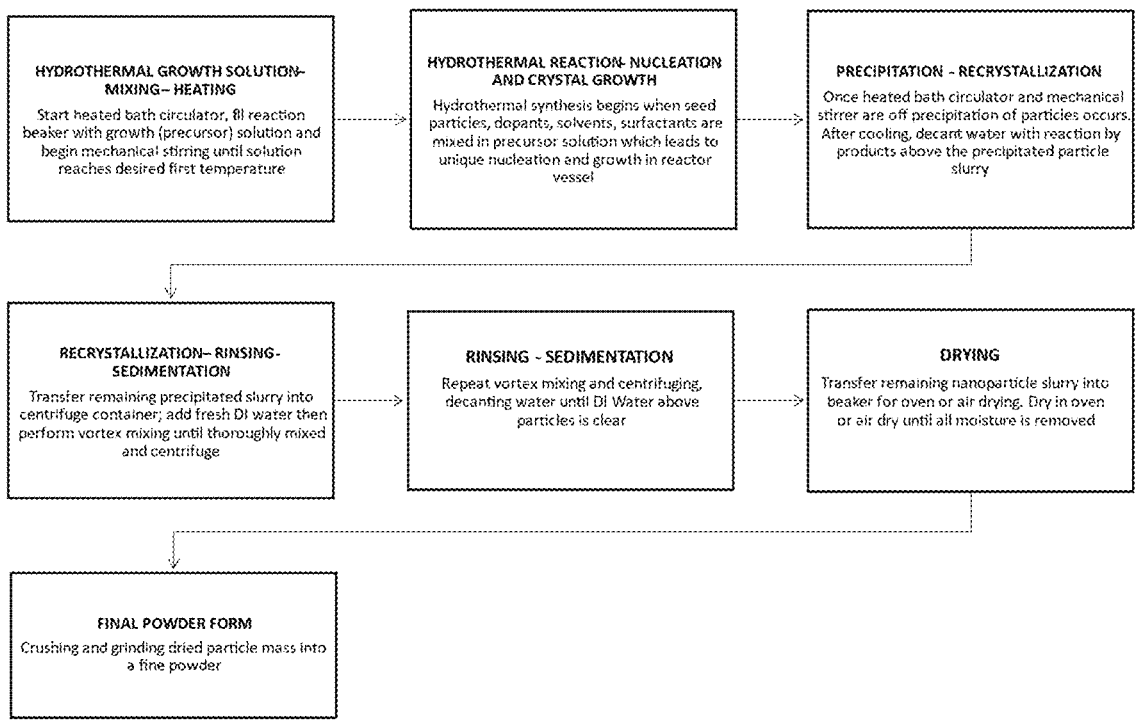
FIG. 2 shows a flow chart of the modified hydrothermal synthesis process according to one aspect of the disclosure.
Figures 3A, 3B, 3C:
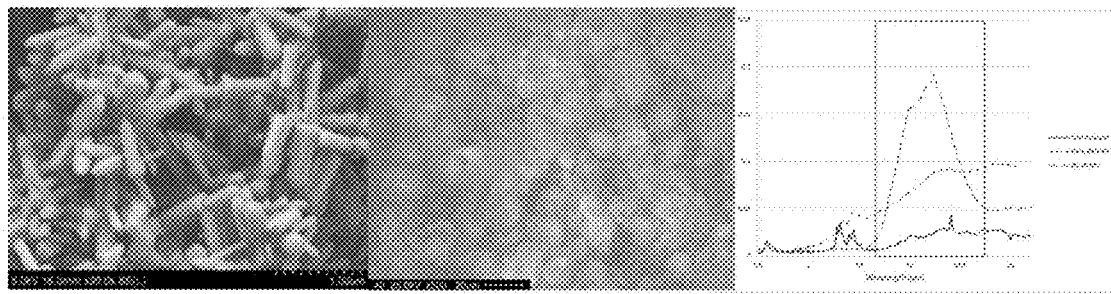
FIG. 3A shows a Scanning Electron Microscope (SEM) micrograph of typical hexagonal morphologies for ZnO nanoparticles.
FIG. 3B shows a Scanning Electron Microscope (SEM) micrograph of innovation displaying a drastic change in morphology resulting in crystalline nanosheets for doped ZnO crystals.
FIG. 3C shows a FTIR analysis for electromagnetic radiation absorption in the infrared spectrum; inside the box is the primary atmospheric window. The results show how nearly pure ZnO nanoparticles obtain more absorption over Zinc oxide powder while depicting how spectral selectivity in the atmospheric window (box in 8-13 µm range) was modified by a method according to the present disclosure. Nanocrystals displaying atypical shapes for ZnO crystals doped ZnO nanocrystals (FIG. 3B) have a distinctive peak within the atmospheric window which demonstrates favorable properties for passive radiative cooling.

The reaction vessel 108 is configured to operate under conditions effective such that a precipitate can form. After the precipitation phase, a combination of a vortex mixer 114 and a centrifuge 116 is used for repeated cycles 118 until the resultant liquid above the sedimented particles is substantially clear. The sedimented particles are then transferred into an oven 120 where excess liquid can be removed. The dry particles are then removed from the oven 120 and crushed using a mortar and pestle 122 to form a powder comprising spectrally selective zinc oxide nanoparticles. FIG. 2 further provides an exemplary flow chart of a synthesis process for forming spectrally selective nanoparticles according to one aspect of the present disclosure.

Nanoparticle Compositions

Also disclosed herein are compositions comprising: a population of polycrystalline zinc oxide nanoparticles (e.g., nanocrystals) doped with one or more dopants, wherein the population of nanoparticles is spectrally selective in the atmospheric window (e.g., from 8 μm to 13 μm). In various aspects, the composition includes a zinc oxide which can provide properties favorable for passive radiative cooling. By way of non-limiting example, wurtzite zinc-oxide has a high thermal conductivity of 50 W/mK at room temperature to deliver efficient heat removal with a high rate of heat transfer, which is another complimentary property for effective radiative cooling. Other favorable properties are a high heat capacity (~40.3 J·K-1 mol-1), low thermal expansion, and high melting temperature (1,974° C.).

In some aspects, the one or more dopants is selected from the group consisting of $Ag_2O$, $Al_2O_3$, $CaCO_3$, $Cu_2O$, MgO, SiC, SiO, $SiO_2$, $SiO_4$, $Si_3N_4$, $SnO_2$, $TiO_2$, $Fe_3O_4$, $VO_2$, SnO, CeO, and combinations thereof. In some aspects, the one or more dopants comprise two or more dopants. For example, various aspects include wherein at least one of the two or more dopants comprises a noble metal (e.g., a noble metal oxide and/or a noble metal nitride). Suitable noble metal dopants include, but are not limited to, platinum, iridium, rhenium, ruthenium, rhodium, palladium, silver, osmium, gold, combinations thereof, and alloys thereof. In some examples, the two or more dopants include $Si_3N_4$ and $SiO_2$.

In some examples, the composition comprising the population of nanoparticles is included in a cooling coating (e.g., a thermal control coating (TCC)) to assist with heat dissipation.

In another aspect, the present disclosure relates to a nanocomposite comprising: a substrate comprising one or more layers deposited thereon, wherein at least one of the one or more layers comprises a radiative cooling layer comprising doped zinc oxide nanoparticles (e.g., nanocrystals) are spectrally selective in the atmospheric window (e.g., from 8 μm to 13 μm).

The term "radiative cooling layer" used herein refers to a layer, or a plurality of layers of the nanocomposite, wherein emission of electromagnetic radiation in the spectrum with wavelengths in the atmospheric window is 30% or more (e.g., 35% or more, 40% or more, 45% or more, 50% or more, 55% or more, 60% or more, 65% or more, 70% or more, 75% or more, 80% or more, 85% or more, 90% or more, 95% or more, or 99% or more). when the radiative cooling layer is exposed to sunlight. In various examples, the composition is configured to provide a passive radiative cooling effect during both day and night.

In various aspects, the substrate comprises aluminum, silver, an alloy thereof, or a combination thereof. In various aspects, the substrate comprises a polymer.

In various aspects, the one or more dopants is selected from the group consisting of $Ag_2O$, $Al_2O_3$, $CaCO_3$, $Cu_2O$, MgO, SiC, SiO, $SiO_2$, $SiO_4$, $Si_3N_4$, $SnO_2$, $TiO_2$, $Fe_3O_4$, $VO_2$, SnO, CeO, and combinations thereof.

In various aspects, the doped zinc oxide nanoparticles are coupled to a surface of the substrate (e.g., using aerosol spraying and/or chemical solution deposition).

In various aspects, the doped zinc oxide nanoparticles comprise a noble metal dopant configured to provide an enhanced plasmonic effect.

In various aspects, the nanoparticles are substantially polydisperse.

In various aspects, the nanoparticles are substantially polymorphic and/or substantially polycrystalline.

In various aspects, the nanoparticles comprise a volume fraction of the radiative cooling layer of from 1% to 10%, such as from 2% to 10%, from 3% to 10%, from 4% to 10%, from 5% to 10%, from 6% to 10%, from 7% to 10%, from 1% to 9%, from 1% to 8%, from 1% to 7%, from 2% to 8%, from 3% to 7%, or from 4% to 6%. In various aspects, the radiative cooling layer has a thickness of from 40 μm to 300 μm (e.g., from 50 μm to 300 μm, from 100 μm to 300 μm, from 100 µm to 250 µm, from 50 µm to 200 µm, or from 100 µm to 150 µm). In various aspects, the radiative cooling layer comprises a filler (e.g., SiO) having the doped zinc oxide nanoparticles randomly distributed therein. Some other suitable fillers include aluminum silicate, silicon dioxide, calcium carbonate, barium sulfate, talcum powder, titanium dioxide, zinc sulfide, ceramic powder, or a combination thereof.

In various aspects, the radiative cooling layer is configured to exhibit a radiative cooling power of 15 W/m² or more (e.g., 20 W/m² or more, 25 W/m² or more, 30 W/m² or more, 35 W/m² or more, 40 W/m² or more, 45 W/m² or more, 50 W/m² or more, 55 W/m² or more, 60 W/m² or more, 65 W/m² or more, 70 W/m² or more, 75 W/m² or more, 80 W/m² or more, 85 W/m² or more, 90 W/m² or more, 95 W/m² or more, 100 W/m² or more).

Although by itself the spectrally selective layer can provide equal or greater cooling power levels than non-spectrally selective materials with a thinner coating and less particles. However, performance can be increased with additional layers. For example, in various aspects, the nanocomposite further includes a convective layer on top and reflective layer on bottom. The top convective layer can reject (e.g., reflects and scatters) the strong solar insolation in the 0.3-2.4 µm wavelength range, while being somewhat transparent to mid range infrared radiation compliments the spectral selective layer. A bottom layer having high levels of reflectivity across the spectrum can additionally be used to further increase cooling power.

In various aspects, the nanocomposite further includes one or more polymer layers. By way of non-limiting example, the one or more polymer layers can include: ethyl cellulose, poly ethyl methacrylate (PEMA), poly methyl methacrylate (PMMA), polyvinyl butyral (PVB), cellulose acetate, polyethylene, polypropylene, polyethylene terephthalate (PET), polyethylene naphthalate (PEN), polyesters, polycarbonates, or a combination thereof.

In some aspects, the nanocomposites are used to coat surfaces of articles and structures such as buildings, vehicles and the like. Some non-limiting examples of coated surfaces include exterior surfaces of office buildings, industrial buildings, residential buildings, sports stadiums, and vehicle body panels.

EXAMPLES

To further illustrate the principles of the present disclosure, the following examples are put forth so as to provide those of ordinary skill in the art with a complete disclosure and description of how the compositions, articles, and methods claimed herein are made and evaluated. They are intended to be purely exemplary of the invention and are not intended to limit the scope of what the inventors regard as their disclosure. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1: Spectrally Selective ZnO Nanocrystals

Disclosed herein is an example of a low cost, scalable, non-pressurized, low temperature, constant stir, hydrothermal batch process to synthesize selectively emitting doped zinc oxide (ZnO) semiconductor nanoparticles for passive radiative cooling. To enhance the passive radiating cooling effect, nanoparticles should reflect most of the incident solar radiation, while also have strong absorption within the primary atmospheric window (8-13 µm wavelength) to emit infrared radiation (heat) through the atmosphere to the cold space. Currently, one material doesn't possess these spectrally selective properties for radiative cooling. Since nanotechnology can alter bulk material properties, synthesis of nanoparticles exhibiting spectral selectivity in the range of 8-13 µm will advance and enhance state-of-the art passive cooling technology.

Materials

The experiment utilized safe and cost-effective materials having little to no toxicity. In an aspect, the precursor solution included either zinc acetate ($Zn(C_2H_3O_2)_2$ or $C_4H_6O_4Zn$) or zinc nitrate hexahydrate ($Zn(NO_3)_2 \cdot 6H_2O$) and hexamethylenetetramine (HMTA), $(CH_2)_6N_4$, also known as methenamine or hexamine, sodium dodecyl sulfonate (SDS), $CH_3(CH^2)_{11}SO_4Na$, sodium lauryl sulfate (SLS), $CH_3(CH_2)_{11}SO_4Na$ and zinc oxide powders <100 nm and <50 nm nominal sizes, all were purchased from Sigma Aldrich.

Experimental Setup

Presented is a low cost, scalable, non-pressurized, low temperature, constant stir, hydrothermal batch process to synthesize selectively emitting nanoparticles for passive radiative cooling. This non-pressurized hydrothermal batch process is a safe, easily scaled, and low energy alternative compared to autoclave synthesis and yields more nanoparticles. Other methods cannot be scaled upward as easily due to limited size of autoclave reaction vessel or small specially prepared substrates in solution. For example, some limitations of autoclaves include high temperature/energy requirements, pressurized reactions, and low working volumes [178]. Remarkably, experimental synthesis of pure zinc oxide (ZnO) nanoparticles exhibited properties to enhance radiative cooling, yet synthesis experiments did not garner spectral selectivity until the particular chemical combinations, dopants, and synthesis process manipulations were used.

Initial experiments focused on evaluating the selectivity of different dopants. Dopants which contributed to spectral selectivity were subjected to repeated experiments to verify repeatability. Next, variations in temperature, dopant amounts, dopant combinations, seed size, surfactants, and solvent type were examined for their effects on the resulting nanoparticle products.

Experimental Procedure

The non-pressurized hydrothermal batch process utilized a Thermo Scientific SAHARA Series heated bath circulator to provide a constant temperature to 500 mL reactor beaker with a magnetic stirrer for the synthesis of nanoparticles. To demonstrate the feasibility of low energy synthesis methods, reaction temperatures were administered in the range of 60-95° C.

The reactor beaker contained the mixture of precursor and seed in 500 ml of deionized water (DI) water. Either the precursor or growth solution had a 26 mM concentration of zinc acetate ($Zn(C_2H_3O_2)_2$ or $C_4H_6O_4Zn$) or zinc nitrate hexahydrate ($Zn(NO_3)_2 \cdot 6H_2O$) and hexamethylenetetramine (HMTA), $(CH_2)_6N_4$. Magnetic stirring was kept at a constant rate during the reaction for each dopant to ensure identical growth parameters for the samples investigated.

The synthesis reaction terminated after ceasing heating and stirring and the solution cooled to room temperature.

After the reaction termination, the particles precipitated and settled to the bottom of the reaction beaker. The remaining DI water above the nanoparticles was decanted using a syringe. The resulting precipitant was then rinsed by placing the concentrated solution in a centrifuge tube with clean DI water, then the tube was placed on a vortex mixer for 30 seconds prior to centrifuging at 4700 rpm for 7 minutes. The cloudy water above the nanoparticles was removed and replaced with clean DI water. The tube was again placed on vortex mixer and rinsed as described above for two or more times until remaining DI water above nanoparticles was clear of reaction byproducts. The remaining nanoparticle concentration was oven dried at 100° C. for ~15 hours, until all the moisture was removed. The layer of dried particles was then pulverized using a mortar and pestle to form dried particle batch into a powder.

Several parameters can be manipulated to effectively control the final properties such as particle size, morphology, chemical combinations, and crystalline structure. For example, changing the growth solution concentration will modify the size of particles and temperature is one variation to modify morphology [44]. Each nanoparticle batch is referenced by the prefix RC (radiative cooling) followed by a batch number.

Nucleation Site Seeding

The experiment used a random dispersion of doped ZnO nanoparticles to form a nanocomposite material. Seeding layers in other synthesis methods typically include a small specially prepared substrate inside a reaction vessel to promote aligned or epitaxial growth of nanoparticles on the substrate. Since this experiment examined the random dispersion of doped ZnO nanoparticles to form a nanocomposite material, there was no seeding layer used during the hydrothermal synthesis. Instead, the seed particles functioned as nucleation sites in the growth solution in a reaction vessel. These seed particles were constantly suspended by magnetic stirring which increased nanoparticle yield since the nucleation site was not limited to the dimensions of the specially prepared substrate. This unique nanoparticle synthesis seeding method also presents a cost-effective and scalable synthesis process for radiative cooling compared to conventional methods. For example, the relatively low-tech autoclave synthesis process has a limited size autoclave reaction vessel placed in high temperature oven which restricts scaling.

The seed particles provided a surface nucleation where dissolved solute could grow into nanocrystals. This process eliminated a major limiting factor for upward scaling found in current state of the art research which rely upon small specially prepared substrates for aligned or epitaxial nanoparticle growth [42]. The nanoparticle-based radiative cooling thick film coating had randomly distributed particles in a medium. Additionally, the seed size and chemical composition used in the process can affect the nanoparticle size, which leads to another process modification presented in this experiment to synthesize multiple size particles in one hydrothermal reactor batch. Initial experiments discovered multiple (aka hierarchical) particle sizes in a matrix exposed to electromagnetic radiation increased spectral selectivity required for radiative cooling. The multiple-size modification results from using nano powders of varying particle sizes to function as a nucleation site (seed) in colloidal solution for nanoparticle growth. Experimental studies with ZnO nano powders with particle sizes <50 nm and <100 nm produced resultant products of different sizes.

Dopants

The addition of dopants can change how a ZnO nanoparticle interacts with the electromagnetic spectrum. Zhou et al. (2014) optimized aluminum nitrate doping for zinc oxide nanoparticles which are commonly referred to AZO nanoparticles to tune absorbance in the 800 nm to 2500 nm wavelength range [262]. However, there is sparse research showing chemical doping of zinc oxide nanoparticles to obtain spectral selectivity for passive radiative cooling in the 8,000 nm to 13,000 nm (8-13 µm) range. Some exemplary candidates for obtaining selectivity include metal oxides and nitrides.

In this experiment, single dopants combined with precursor solution and surfactant demonstrated spectral selectivity. Some of the dopants investigated include $Ag_2O$, $MgO$, $SiC$, $SiO$, $SiO_2$, $Si_3N_4$, $SnO_2$, $TiO_2$, $Fe_3O_4$, $Al_2O_3$, $SnO$, and $CeO$. In some batches, a single dopant showed high spectral selectivity in the investigated range of wavelengths. Further experiments were conducted combining more than one dopant. For example, batch RC 41 introduced two dopants of $Si_3N_4$ and $SiO_2$ early in the process—selectivity within the window consisted of double peaks higher than single dopants however less absorptance over the whole atmospheric window was observed.

Surfactants

Another component of the growth solution, hexamethylenetetramine (HMTA), $(CH_2)_6N_4$, also functioned as a surfactant. Adding another surfactant like sodium dodecyl sulfate (SDS) or sodium lauryl sulfate (SLS), $CH_3(CH_2)_{11}SO_4Na$, decreased surface tension and assisted with dispersing and suspending nanoparticles in solution to prevent agglomeration during synthesis [47].

Agglomeration

It was discovered that not only different sized nanoparticles enhanced radiative cooling, but also the agglomeration did not adversely affect the spectral properties. Agglomeration was purely visible, yet the sample produced high levels of radiative cooling. Nevertheless, sonication of nanoparticle mixtures over 30 minutes greatly reduced agglomeration.

Characterization of Nanoparticles

The nanoparticles were characterized using Fourier Transform Infrared (FTIR) spectroscopy, UV-Vis spectroscopy, Scanning Electron Microscope (SEM), X-ray diffraction (XRD), Zeta sizer, and thermal testing techniques.

Spectral analysis by Fourier Transform Infrared (FTIR) Spectrometer verified synthesis of spectrally selective nanoparticles. The infrared spectroscopy for nanoparticles was performed using the Perkin Elmer Series 100 FTIR with Attenuated Total Reflectance (ATR) attachment. Sample preparation for ATR spectral analysis involved powder form of nanoparticles upon diamond ATR lens.

The infrared spectrum for pure ZnO powder (<100 nm) has low infrared absorption. When this powder was introduced into a growth solution for hydrothermal synthesis of ZnO nanoparticles the spectrum significantly changed with absorption rapidly increasing from 6-12 µm and kept high levels past 15 µm. Despite this increase in absorbance, these broadband nanoparticles displayed no selectivity for wavelengths in 8-13 µm range of the atmospheric window.

Replication of $Si_3O_4$ doped ZnO hydrothermal batch synthesis of RC 10, 35, and 40 produced relatively consistent results despite minor variations in the process. Without wishing to be bound by theory, the increased selectivity of batch RC 40 was hypothesized to be attributed to the improved rinsing process with the introduction of centrifuging to get rid of more reaction byproducts but also exerted a force on particles to replicate the sedimentation process and further assist with recrystallization. The spectra of RC 41 largely reflected the use of 2 dopants, $SiO_2$ and $Si_3N_4$, which have different absorption peaks. Increased absorption peaks at ~10.75 µm and at ~11 µm exceeded the peaks for single dopant while still maintaining spectral selectivity.

Figure 8:
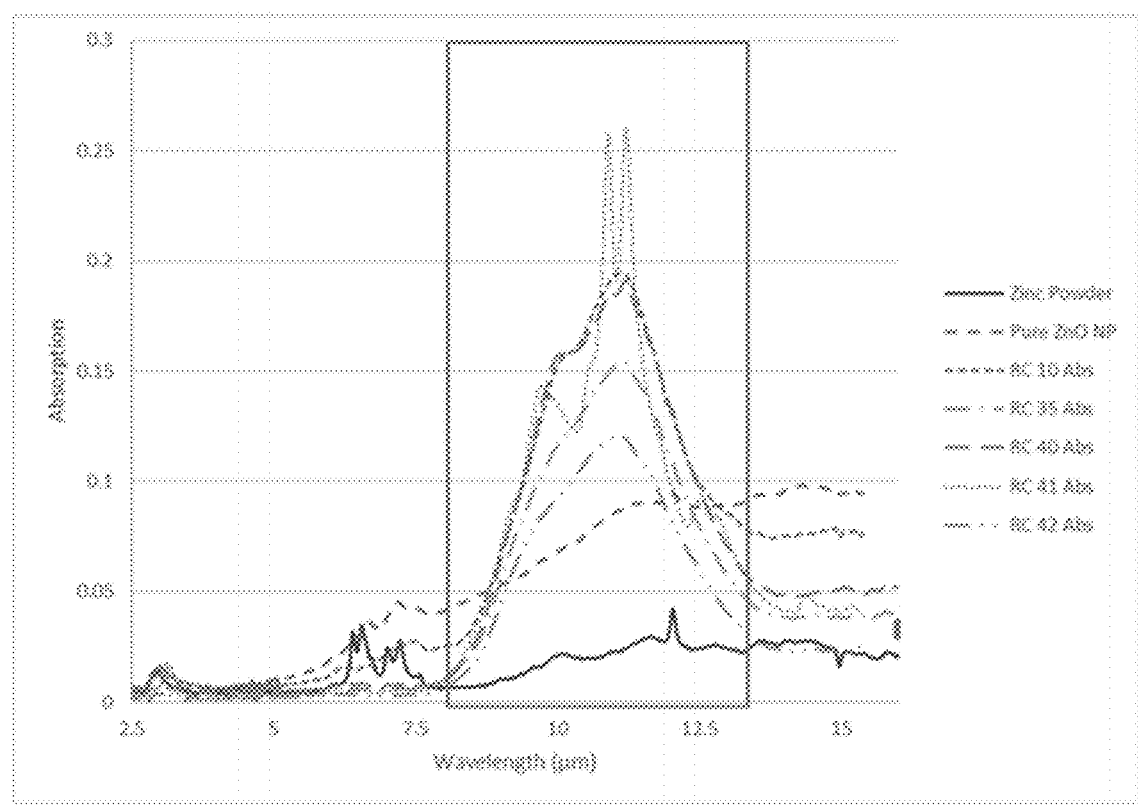
FIG. 8 shows a spectral analysis results reveal consistent levels of high reflectivity of solar irradiance outside the atmospheric window (8-13 µm) with absorption peaks inside the atmospheric window equating to higher levels of radiative cooling for doped ZnO nanoparticles (RC 10, 35, 40, 41, 42) than pure zinc oxide powder and pure ZnO nanoparticles. The synthesis process can additionally tailor absorption levels within the atmospheric window to yield differing cooling levels which can be beneficial for building integration in colder climates to avoid increased heating load penalty.
Figure 9:
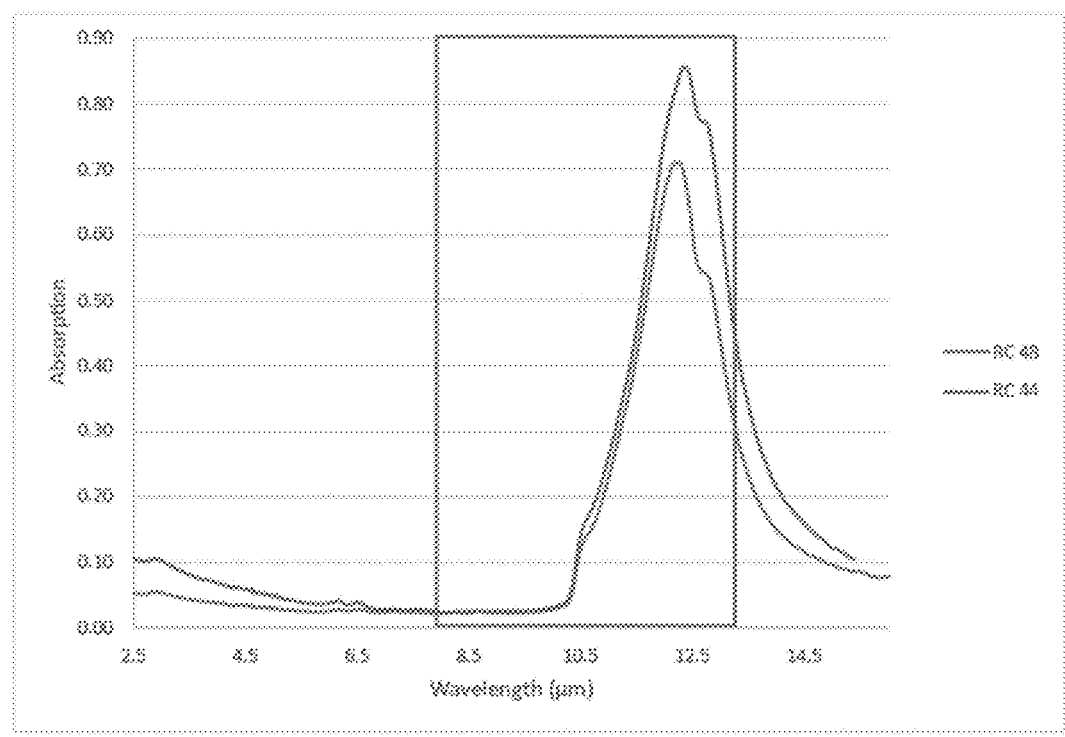
FIG. 9 shows a spectral analysis for doped ZnO nanoparticles (RC 44 and 48) demonstrating the synthesis process can produce favorable properties for passive radiative cooling, high reflectivity of solar irradiance outside the atmospheric window (8-13 μm) with high absorption peaks (70-85%) inside the atmospheric window.
Figure 13:
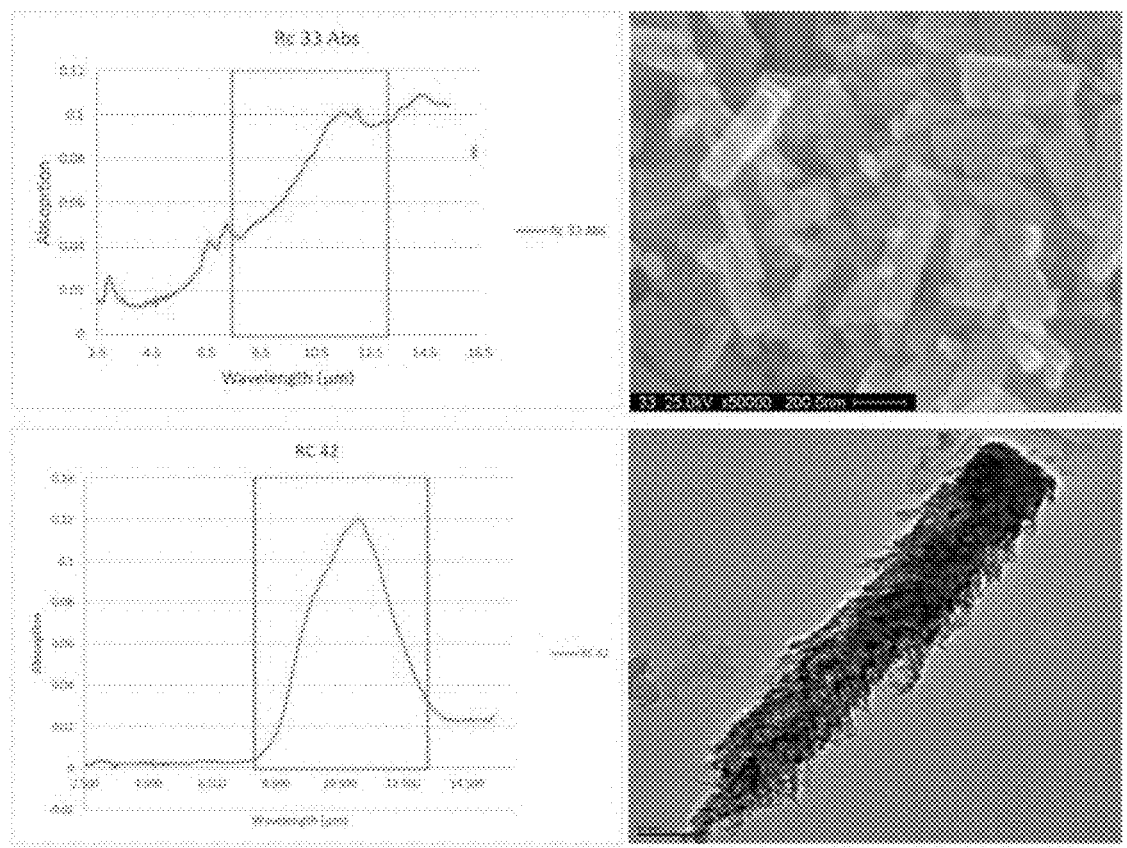
FIG. 13 shows infrared absorption spectrum for doped ZnO nanoparticles from RC 33 batch (top left) SEM image (top right); RC 42 batch demonstrates spectral selectivity inside atmospheric window 8-13 μm (bottom left) and TEM of coated RC 33 seed particle in RC 42 batch (bottom right).
Figures 14A, 14B, 14C, 14D:
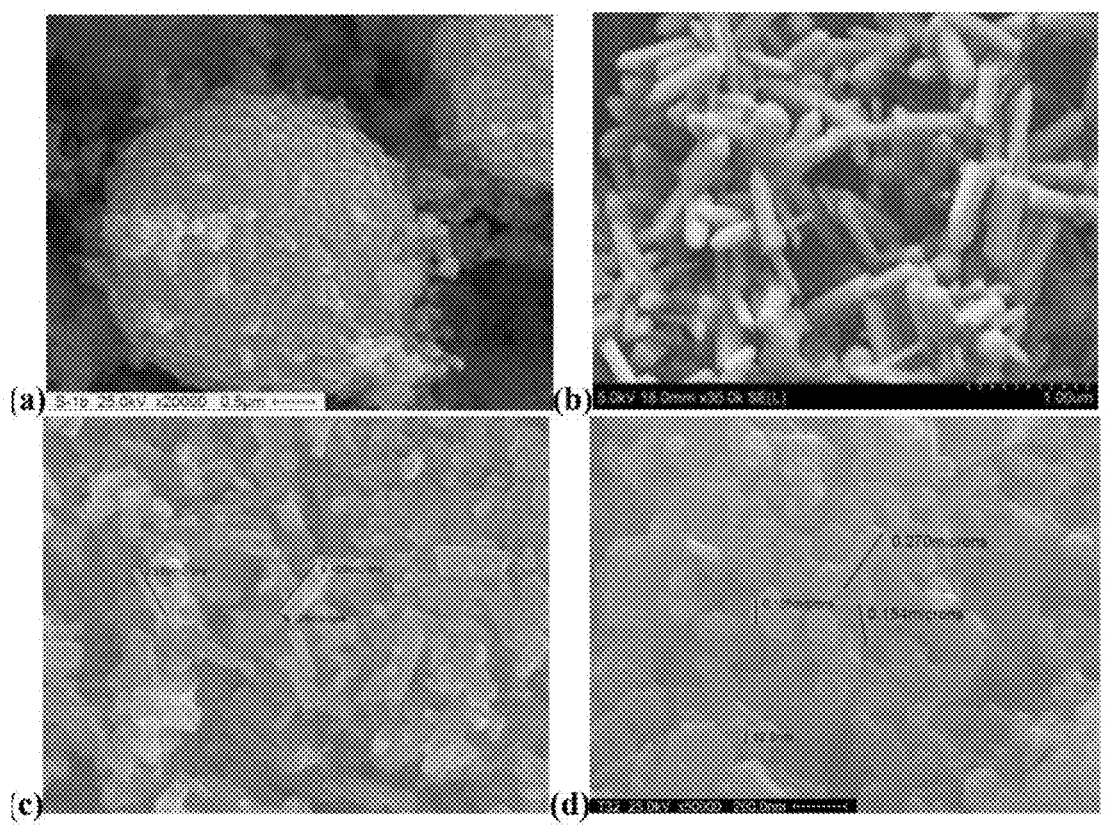
FIGS. 14A-14D show SEM micrographs of hydrothermally synthesized ZnO nanoparticles.
Figures 15A, 15B, 15C, 15D, 15E:
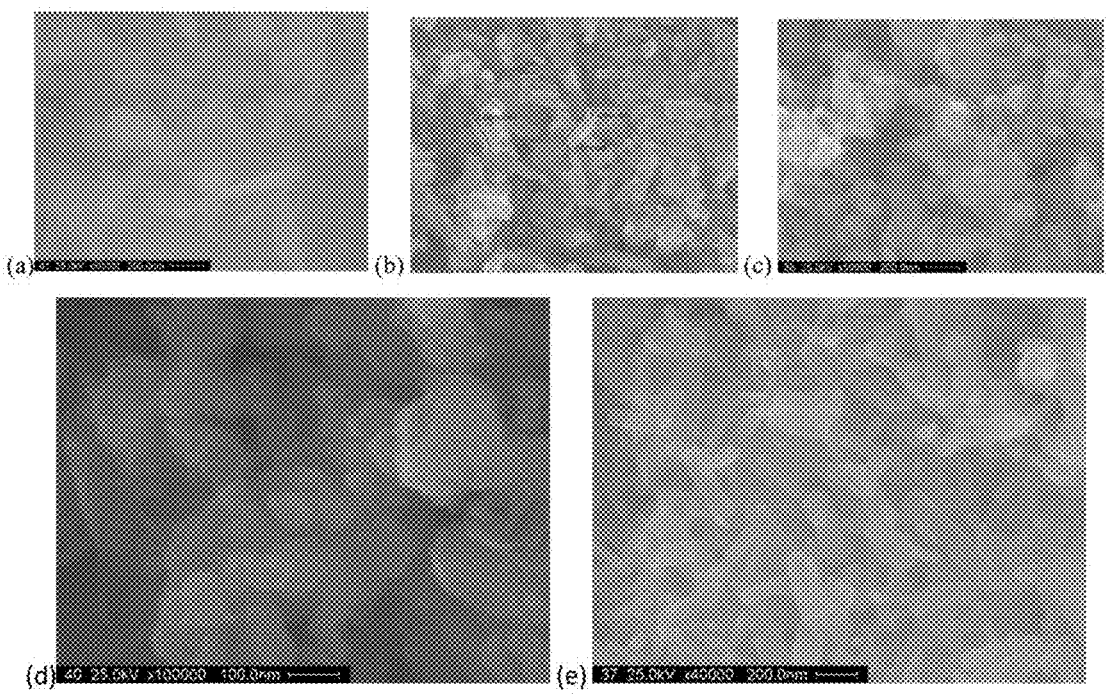
FIGS. 15A-15E show SEM image of doped ZnO batches with hierarchical sized nanoparticles.

Multiple sized nanoparticle batch, RC 33, FIG. 13, was unable to obtain close to ideal spectral selectivity in atmospheric window for radiative cooling. However, when RC 33 nanoparticles were used as seed for precursor solution in a later batch (RC 42), the atmospheric spectral selectivity with an absorption peak at 10.6 µm and increased reflectivity outside the atmospheric window 8-13 µm was attained. The RC 42 nanoparticles TEM image, FIG. 13 bottom right, depicts RC 33 nanoparticle coated with new ZnO crystallization. Thus, the experiment unexpectedly observed that spectral selectivity could be achieved by using doped ZnO nanoparticles as a seed in growth solution of the hydrothermal synthesis process which coated the nanoparticles with a new crystal layer. Replication of the atmospheric spectral selectivity showing high absorption within the atmospheric window (8-13 µm) and minimal absorption outside the window with doping ZnO nanoparticles during the hydrothermal synthesis process is demonstrated in FIG. 8.

Ultraviolet and Visible Spectroscopy

Figure 7:
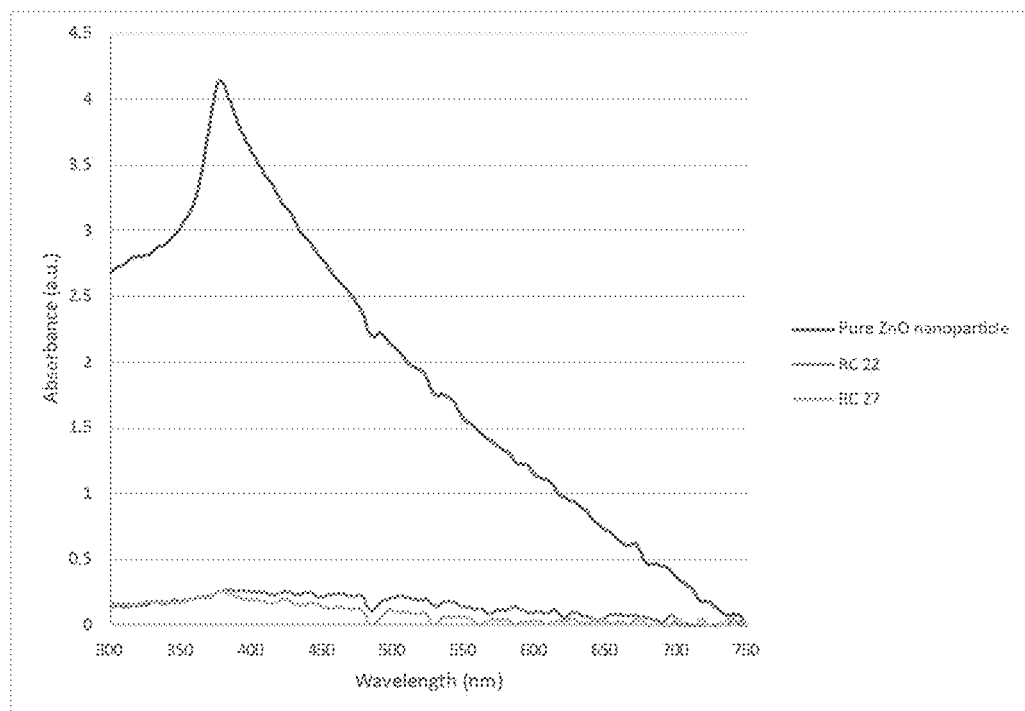
FIG. 7 shows a spectral analysis depicting pure ZnO nanoparticles with a distinctive absorbance peak at 378 nm wavelength, while the synthesis process with doping altered the material properties of ZnO nanoparticles (RC 22 and 27) to become highly reflective over the entire ultraviolet and visible spectrum.

Ultraviolet and visible spectroscopy (UV-Vis) spectroscopy equipment included the Ocean Optics USB-2000 UV-Vis-NIR spectrometer and the DeNovix DS-11 Spectrophotometer/Fluorometer. This equipment also included the near infrared spectrum (NIR) into the analysis. UV Vis spectral analysis verified certain nanoparticle doping combinations produce enhanced reflection and/or scattering. The pure ZnO nanoparticles labeled as ZnO 16 hr. in FIG. 7 had a distinct absorbance peak at 378 nm wavelength, while doped ZnO nanoparticles from batch RC 22 are highly reflective over the entire UV-Vis spectrum.

Nanoparticle Size Distribution

Particle size distribution measurements for each batch were conducted with Malvern Zetasizer nano series instrument using a quartz cuvette with nanoparticles dispersed by sonication of at least 25 minutes in DI water. Normally with batch nanoparticle synthesis one particle size becomes predominant. To increase spectral selectivity favorable for passive radiative cooling experimentation into obtaining more than one size of nanoparticle per batch was conducted.

Figure 6:
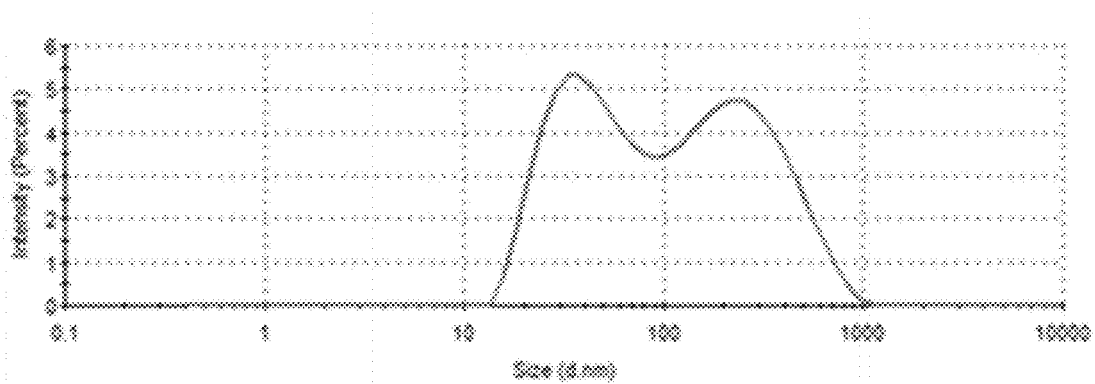
FIG. 6 shows a graph from particle size analysis depicting two peaks representing 2 particle sizes where 47.9% of the particle size was 45.7 nm, while 52.1% had a particle size of 270 nm. These results confirm the effective use of two different seed sizes in a precursor solution to produce two different size nanoparticles in the same batch.

The RC 24 batch in FIG. 6 had two peaks graph representing 2 particle sizes where 47.9% of the particle size was 45.7 nm, while 52.1% had a particle size of 270 nm. These results confirm the successful use of two different seed sizes in precursor solution the batch to produce two different size nanoparticles in the same batch. This process can be further modified to obtain particle size combinations offering favorable results for the particular application.

Scanning Electron Microscope (SEM)

The SEM provides visual analysis of nanoparticle size and morphology. The Hitachi 5800 and the Hitachi SU70 SEMs were utilized in this study. The hydrothermal process batch process in this experiment can produce a wide array of sizes and morphologies as seen in FIGS. 14A-14D. FIGS. 15A-15E shows the batches with high spectral selectivity unexpectedly come in many shapes and sizes, which is contrary to other research emphasizing uniform morphology and size. The resulting nanoparticles show a crystalline structure and exhibit strong agglomeration like the crystalline nanosheets. Nevertheless, most of these nanoparticle batches obtained higher spectral selectivity compared to commonly used radiative cooling compounds found in the leading commercially available cool roof coatings and passive radiative cooling research.

Transmission Electron Microscopy (TEM)

Figures 4A, 4B, 4C:
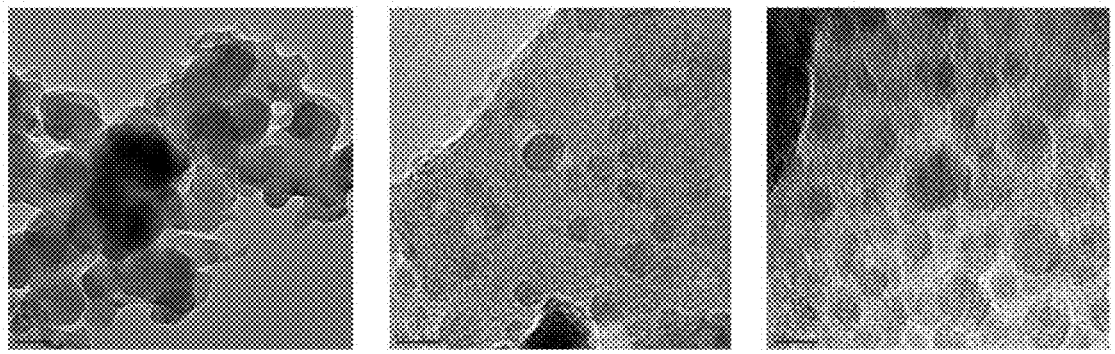
FIG. 4A shows a Transmission Electron Microscopy (TEM) image of nanocrystal showing atypical morphology for ZnO nanocrystals at 50 nm magnification.
FIG. 4B shows a Transmission Electron Microscopy (TEM) image of nanocrystal showing doped ZnO crystalline nanosheets dispersed in many orientations for a polycrystalline structure at 5 nm magnification.
FIG. 4C shows a Transmission Electron Microscopy (TEM) of nanocrystal showing doped ZnO crystalline nanosheets dispersed in many orientations for a polycrystalline structure at 5 nm magnification.
Figure 5:
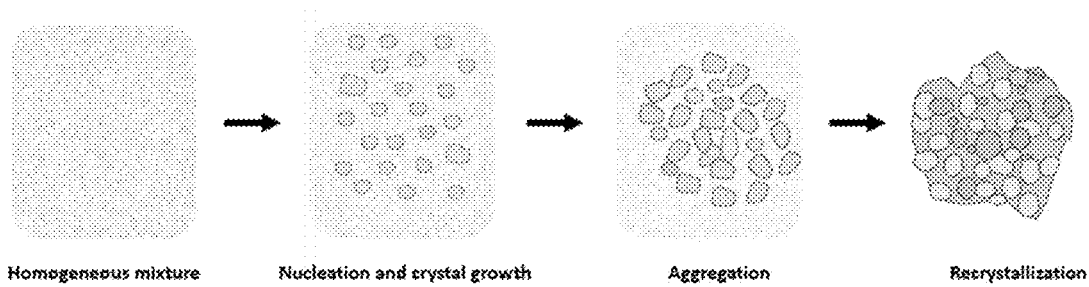
FIG. 5 shows a flow diagram of the recrystallization process which starts with mixing a homogeneous solution comprised of precursor solution with the addition of seed particles and dopants. The seed particles serve as nucleation sites as the nanocrystals start to grow while suspended in continuously mixed solution. Subsequently, the growing particles aggregate which leads to the generation of polymorphic crystals. The polymorphic and polycrystalline nanostructures displayed favorable spectral selectivity for passive radiation cooling.

The TECNAI F20 TEM with a point resolution of 0.24 nm (2.4 Angstrom) and magnification range of 25×-1030 k× was used for analytical nanostructure analysis. Transmission Electron Microscope (TEM) analysis for RC 40 revealed recrystallization in the synthesis process resulting in crystalline nanosheets in multiple orientations fused together with random crystallographic orientations to form a polycrystalline structure as seen in FIGS. 4A-4C. The crystalline nanosheets in multiple orientations observed by the TEM analysis for RC 40 contribute to the spectral selectivity of these nanoparticles. The random arrangement and multiple sizes of crystals in FIGS. 4A-4C clearly depict the unique structure which obtains favorable spectral selectivity.

X-Ray Diffraction (XRD)

The crystalline structure of doped ZnO nanoparticles was examined with a Powder X-ray diffraction (XRD) model PANalytical X'Pert Pro MRD system with Cu Kα radiation (wavelength=1.5442 Å) operated at 40 kV and 40 mA. XRD is an analytical technique for determining the degree of crystallinity of a sample as well as what crystal structures exist. The spacing of the various peaks also gives the information for determining the crystal structure lattice parameters. Also, XRD can be used for phase identification of a crystalline material and can provide information on unit cell dimensions. These diffracted X-rays are then detected, processed, and counted. By scanning the sample through a range of 2θ angles, all possible diffraction directions of the lattice should be attained due to the random orientation of the powdered material. Conversion of the diffraction peaks to d-spacings allows identification of the mineral because each mineral has a set of unique d-spacings. Typically, this is achieved by comparison of d-spacings with standard reference patterns [40].

Data is presented as peak positions at 2θ and X-ray counts (intensity) in the form of a table or an x-y plot. Intensity (I) is either reported as peak height intensity, that intensity above background, or as integrated intensity, the area under the peak. The relative intensity is recorded as the ratio of the peak intensity to the most intense peak (relative intensity=I/I1×100). Peak positions occur where the X-ray beam has been diffracted by the crystal lattice. The unique set of d-spacings derived from this patter can be used to 'fingerprint' the mineral. Broad diffraction peaks are typically attributed to a smaller particle size.[48]

Scherrer Equation (Equation 1) can be used to determine crystallite size:

$$P = \frac{k\lambda}{\beta \cos \theta} \tag{1}$$

where P is the average crystallite size, k (k=0.9) is particle shape factor, λ is the X-ray wavelength (0.1542 nm), β is the angular line width of half-maximum intensity and θ is the Bragg's angle.

UV-Vis spectroscopy equipment included the Ocean Optics USB-2000 UV-Vis-NIR spectrometer and the DeNovix DS-11 Spectrophotometer/Fluorometer. UV Vis spectral analysis verified certain nanoparticle doping combinations produce enhanced reflection and/or scattering. The pure ZnO nanoparticles labeled as ZnO 16 hr in FIG. 7 had a distinctive absorbance peak at 378 nm wavelength, while doped ZnO nanoparticles from batch RC 22 were highly reflective over the entire UV-Vis spectrum.

Particle size distribution measurements for each batch were conducted with Malvern Zetasizer nanoseries instrument using a quartz cuvette with nanoparticles dispersed by sonication in DI water. The RC 24 batch had two peaks graph representing 2 particle sizes where 47.9% of the particle size was 45.7 nm while 52.1% had a particle size of 270 nm. These results confirm the use of 2 different seed sizes in the batch process produced 2 different size nanoparticles in the same batch.

Although the hydrothermal process could produce spherically shaped nanoparticles, further experimentation with spherical nanoparticles did not resume since better passive radiative cooling results were obtained with other morphologies. XRD analysis verified new peaks obtained from the crystallographic planes of hexagonal ZnO show that the dopant combinations altered the ZnO crystalline structure. For example, two different dopants for batch RC 32 and RC 38 produced nanocrystals with differing peak intensities for same peak positions and extra peaks for RC 38 verify different crystal systems.

Figure 10:
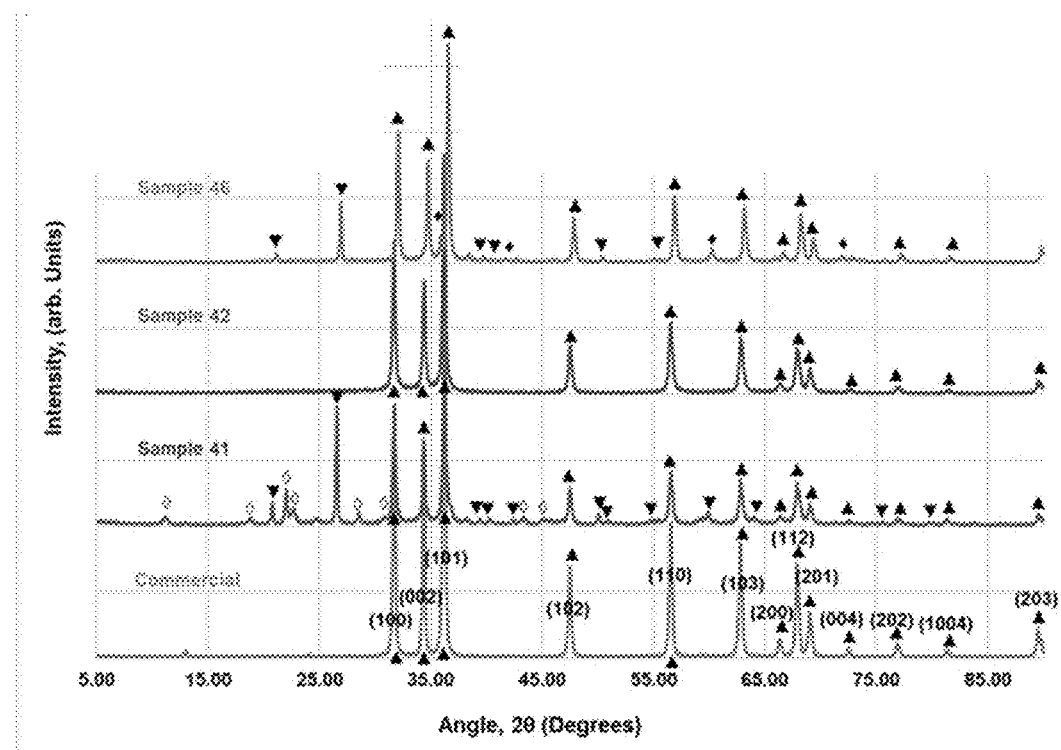
FIG. 10 shows that the presently disclosed synthesis process and doping of parent material ZnO (Commercial) produced changes in XRD spectra, which is indicative of modifying the parent structure.
Figure 11:
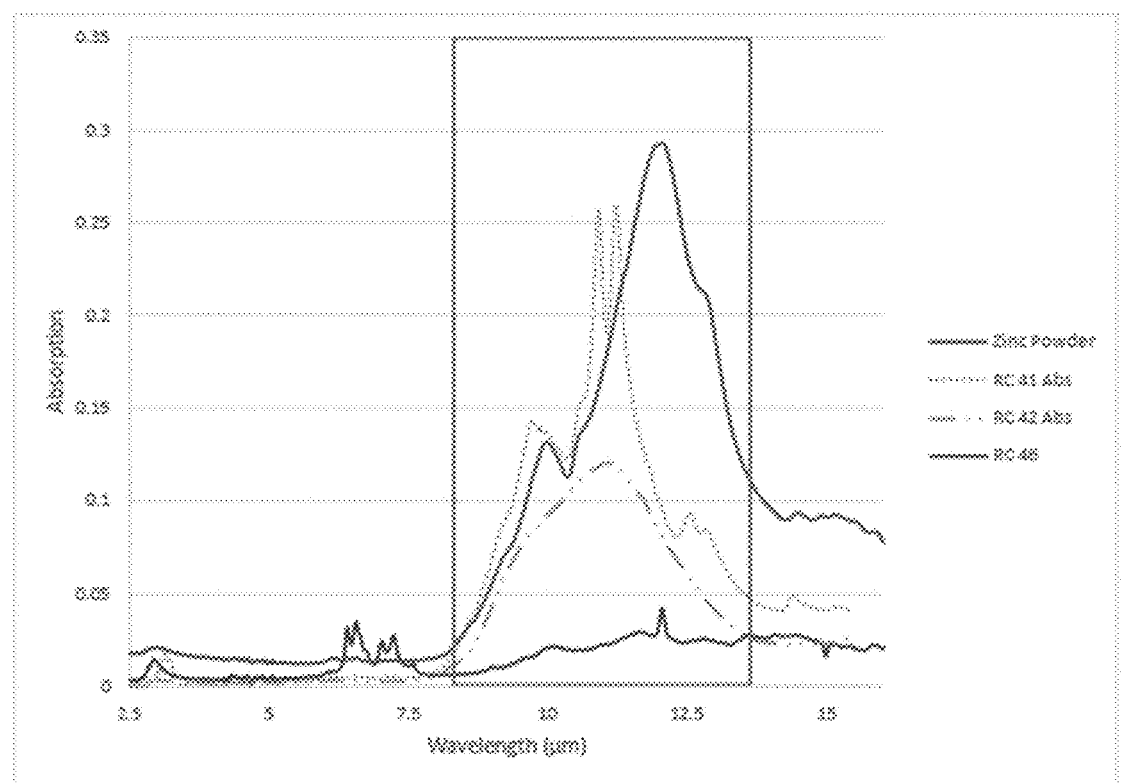
FIG. 11 shows a spectral analysis of pure ZnO (Commercial) and doped ZnO nanoparticles (RC 41, 42, 46) demonstrates how changes in the parent structure, such as crystallite size and lattice strain contribute to obtaining properties favorable for passive radiative cooling.

FIG. 10 illustrates a stacked comparison of XRD analysis on three nanocrystalline semiconductor batches RC 41, RC 42, and RC 46 to the commercially available ZnO powder the bottom pattern. The crystallite size for the ZnO phase were calculated using Scherrer's formula for the commercial ZnO powder, RC 41, RC 42, and RC 46 were 323 nm, 269 nm, 296 nm, and 340 nm respectively. Table 1 below provides a summary of how crystallite size (aka grain size) and lattice strain of the parent structure pure ZnO (Commercial) was modified by the synthesis process in doped ZnO nanoparticles (RC 41, 42, 46). The variations in the semiconducting crystal parameters are likely contributing to different spectral selectivity observed in this research. Shifting or new XRD peaks are an indication of structural changes in a material. The doping of the pure zinc oxide material resulted in many changes to the XRD spectra, which can partially be attributed to the dopant modifying the pure zinc oxide structure.

TABLE 1

XRD analysis of modified ZnO nanoparticles

| Samples | Phase | Crystallite Size (nm) | Lattice Strain (%) |
|---|---|---|---|
| Commercial | ZnO | 323 | 0.02 |
| Sample 41 | ZnO | 269 | 0.06 |
| Sample 42 | ZnO | 296 | 0.156 |
| Sample 46 | ZnO | 340 | 0.05 |

The present hydrothermal batch synthesis method for doping ZnO nanoparticles was used to obtain spectrally selectivity for radiative cooling. Spectral analysis of doped nanoparticles verified selective and enhanced absorption within the primary atmospheric window. This study additionally demonstrated the ability to precisely tune a spectrally selective coating depending on the particular application parameters. Here, the nanoparticles introduced were tuned to be selectively emitting in the atmospheric window and highly reflective outside the window. The present experimental results demonstrate a cost effective, safe, and scalable process mechanism for producing spectrally selective nanoparticles.

Example 2: Spectrally Selective Thick Film Nanocomposite

A spectrally selective thick film nanocomposite was formed using the doped zinc oxide nanoparticles from Example 1. The fabrication concept in this research is akin to microelectronic thick film fabrication only in the sense that it's also an additive process which entails the application of thicker paste layers and thinner ink layers upon substrate as needed. The layers are added sequentially to the substrate to create a thick film nanocomposite with the desired properties. The resultant performance is dependent upon many factors like substrate properties, nanoparticle properties, medium properties, and climatic conditions. Another departure is much lower energy for fabrication process since high curing temperatures are not required. The binders (mediums) in the film adhere to surfaces and dry at standard ambient temperatures to be cost effective and scalable like cool roof coatings.

Application Methods

The application methods in this research are chemical solution deposition (CSD) and/or spray coating of a paste and/or ink layers upon a substrate in FIGS. 16A-16E. This research employs easy-to-apply mediums to form a thick film containing a random distribution of particles. This is a departure from many passive radiative cooling fabrication and limited scale application methods requiring controlled environment and multiple layers with precise nanoscale thickness.

Figures 16A, 16B, 16C, 16D, 16E:
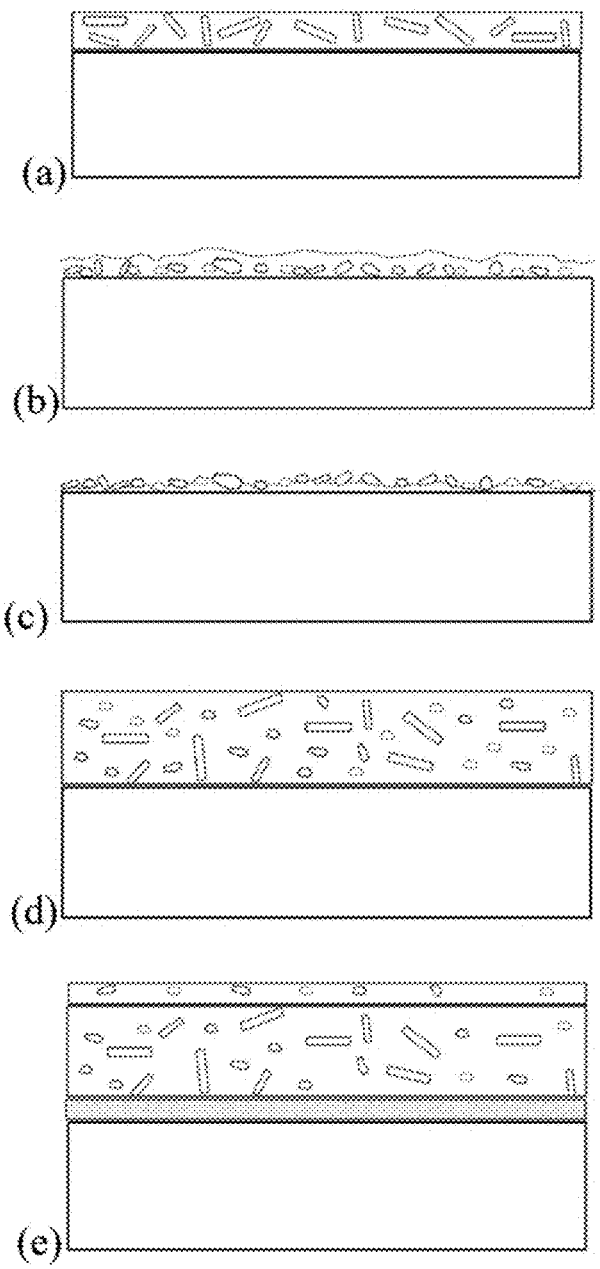
FIGS. 16A-16E show schematics of thick film nanocomposites over aluminum plate substrate (not to scale) application methods.

The thick film was composed of robust materials which could withstand outdoor exposure to temperature extremes and solar radiation. In addition to the low-cost scalable application options layering options are introduced to account for differing environmental conditions and substrate properties. Shown in FIG. 16A-16E are five cost effective thick film nanocomposite structures fabricated by simple application methods of CSD and/or spraying. Note, the illustrations are not to scale. One-step ink layer, FIG. 16A, has aerosol spraying of nanoparticles and medium mixture to form an ink layer. Experiments with siloxane and xylene 50:50 mixture formed the medium for nanoparticles. The volume fraction of particles was 5%. Two-step ink layer, FIG. 16B, is deposition/spraying of a solvent and nanoparticle mixture on substrate. The solvent must exhibit good wettability to spread nanoparticles uniformly over surface. Ethanol and isopropanol solvents provided excellent wettability an even coating over substrates without cracking. Enables direct contact of nanoparticles with metal surface, which due to noble metal doping of semiconductor also enhanced plasmonic effect. After solvent evaporates is to spray a binder coating over the nanoparticle layer to adhere, encapsulate, and form a protective covering over the substrate. Acrylic paint over dried nanoparticle layer worked not only to encapsulate and adhere nanoparticles to surface, but also provided complimentary absorption in atmospheric window.

Two-step ink layer, FIG. 16B, is deposition/spraying of a solvent and nanoparticle mixture on substrate. The solvent must exhibit good wettability to spread nanoparticles uniformly over surface. Ethanol and isopropanol solvents provided excellent wettability an even coating over substrates without cracking. Enables direct contact of nanoparticles with metal surface, which due to noble metal doping of semiconductor also enhanced plasmonic effect. After solvent evaporates is to spray a binder coating over the nanoparticle layer to adhere, encapsulate, and form a protective covering over the substrate. Acrylic paint over dried nanoparticle layer worked not only to encapsulate and adhere nanoparticles to surface, but also provided complimentary absorption in atmospheric window.

Spectrally selective particles adhering to binder coating on substrate surface in FIG. 16C. Application of binder to a surface followed by adhesion of spectrally selective particles on top of binder. The top surface of particles not embedded in binder are exposed to the atmosphere like the grains in tar-based roofing shingles or rolls. One-step paste layer, FIG. 16D, has a higher particle to volume ratio than the ink layer and can consist of a mixture of bulk materials, binder, fillers, and nanoparticles. Cool roof coatings are simply paste layers which according to specification are to be of an average thickness of 558.8 µm (22 mil) after application. Deposition methods can include but are not limited to self-leveling or assisted level of paste deposited within borders of desired coating thickness, brushing, spraying, or rolling.

Multi-layer, FIG. 16E, is an additive combination of pastes and/or ink layers multiple layer process, can progress to become a solution for tuning radiative cooling power with different mixtures and layering combinations for different climatic conditions. This research has demonstrated that ink layers alone over a reflective substrate can provide radiative cooling. Incorporating a reflective bottom layer will be crucial to obtain daytime radiative cooling with ink layers. Ink layers can be below or above paste layer. However, this study has also demonstrated that the addition of an ink layer over a paste layer can increase selectivity.

Layering Options

The environmental conditions, substrate properties, and factor into what type of layering option may be applied to surface. The film may consist of one or more layers embedded with spectrally selective radiative cooling nanoparticles and/or fillers to enhance or tailor radiative cooling. The endless combinations this approach provides to tailor thick film nanocomposite coatings embedded and the layering of the for colder climate locations to avoid a heating load during winter months while providing a robust contiguous coating on surfaces exposed to solar radiation. The order of these materials/structures facing the sun does matter. If the substrate is a back reflector like aluminum only one layer upon the substrate will suffice if it contains spectrally selective radiative cooling nanoparticles. However, the film must be thick enough to lessen the convective and conductive heat transfer to the aluminum. The first layer for a non-reflective surface close to a black body absorber should be a reflective layer, unless a highly reflective cover or shield is a top layer The fabrication method presented is a cost-effective and robust departure from experimental studies. The equipment is rather simple and inexpensive low investment, low energy, and capable of large-scale application. The nanoscale precision is found in the spectrally selective nanoparticles and fillers embedded in film mediums.

Film Thickness

A thin film is not feasible for real world structural coating applications since it can be 1000 times thinner than a 100-micrometer thick film. Finding an optimal thickness of coating is a fabrication goal, however, an optimal range of thicknesses is more realistic with simpler lowercost application methods. An engineering tolerance is necessary to provide radiative cooling for variations in film thickness due to different substrate properties and uneven surfaces since the thick film nanocomposite coating will have variations in thickness over large surface areas. So, the focus of this research includes obtaining radiative cooling with more durable thick films. Reflective substrates can radiatively cool with a thinner ink coating. Published experimental work found that maximum diffuse reflectance around 97% was achieved with a 0.25-mm (250 µm) thick coating having 17% pigment to binder weight ratio [22]. This research found that for a reflective substrate a film thickness of 40-300 µm can still provide radiative cooling. However, highly absorbing substrates require a thicker paste coating or a reflective coating on the materials surface. This research observed a lower level of cooling for films less than 400 µm in thickness which agrees with reports that material properties become independent of substrate at thickness of 400 µm or greater [22].

Volume Fraction

Random particle distribution within a medium is one of the simplest and cost-effective methods to provide daytime "radiative cooling" experimentally demonstrated in research. It is interesting to note that low volume fractions ~4-5% nanoparticle concentration with a reflective substrate can obtain daytime radiative cooling [19, 20, 21, 23, 24]. Particle concentrations greater than 25% are predicted to achieve a greater degree of radiative cooling yet are not fully explored in research due to limitations in application and mediums. The thick film in this research accommodates these higher volume fractions. Also, a commercially available cool roof coating can attain "reflective cooling" with a much higher volume fraction, between 38-79%, of random particles distributed in a binder [13]. The volume fraction of particles to the medium can be determined with Equation 2:

$$f_{v,exp} = \frac{(X_p/\rho_x)}{(X_p/\rho_x) + V_y} \quad (2)$$

where $f_{v,exp}$ [dimensionless] is the particle volume fraction for the experiment, $X_p$ (g) is the weight of nanoparticles, $\rho_x$ [g/m³] is the density of nanocomposite powder and $V_y$ [m³] is the volume of binder/matrix [23]. The volume fractions were identified for experimental studies of nanoparticle-based radiative coolers.

Characterization of Thick Film Nanocomposites

The thick film nanocomposite was characterized using UV-Vis spectroscopy, Fourier Transform Infrared (FTIR), Scanning Electron Microscope (SEM), Zeta sizer, and performance testing techniques. Samples were prepared on aluminum or a black reinforced polypropylene (PPR) geosynthetic substrates. The resulting spectral analysis provided information for tuning the radiative cooling of thick film nanocomposite.

Infrared Spectroscopy

Since the primary atmospheric window is within the infrared spectrum this research concentrated on infrared spectroscopy to obtain desired spectral selectivity. Infrared spectroscopy was performed by Jasco FTIR-6300 spectrometer and a Pike 30spec specular reflectance attachment with a variable aperture designed for the measurement of thick films held the samples. To obtain a better understanding of FTIR graphs display the logarithmic values of absorption (A) or (Abs) to tune transmittance within the atmospheric window to the lowest levels. This study used the logarithmic Abs scale obtained with Equation 3 to maximize Abs in the atmospheric window, which observed a peak Abs value of 3 of means T<0.1% for the sample. Most published research normalizes the absorptivity range from 0-1, however, an Abs value of 1 would equal 10% T, so if you set the scale from 0-1, then you would only see the data if it fell within the 10-100% T range [49].

$$A = 2 - \log_{10} \%T \quad (3)$$

A minimal amount of T over the spectrum was desirable to prevent thermal radiation from heating the substrate under thick film nanocomposite. The absorptivity results from FTIR spectral analysis are the function of a logarithmic equation, derived from Beer's Law, which converts transmissivity (T) into absorptivity (A) using Equation 3.

Experiments which integrated spectrally selective nanoparticles into the thick film nanocomposites increased absorption levels over the entire infrared spectrum, while the spectrum shape and absorption peaks closely resembled that of the acrylic medium. Nevertheless, the more spectrally selective the nanoparticle the more influence it will have in making the nanocomposite film more selective. For example, in FIG. 12, since the RC nanoparticle's spectrum was more selective than the RC 9 and RC 16 nanoparticles the RC 10's thick film had a higher level of reflection outside the atmospheric window to produce the spectrum closest to the ideal spectral selectivity for passive radiative cooling. These experiments demonstrated that it was possible to tune the thick film nanocomposite's selectivity and absorption levels with nanoparticles of differing spectral selectivity randomly dispersed in a medium. Spectral analysis classified the cool roof coating as a broadband emitter due to the strong absorption over the entire infrared spectrum, while the thick film nanocomposites containing selective nanoparticles were classified as selective emitters. A cool roof coating can be considered a thick film paste layer; however, it had a higher volume fraction of micro and nanosized particles and is on average ~300 μm thicker than thick film nanocomposite in the analysis.

Nanocomposite pastes including SiO particles and spectrally selective ZnO nanoparticles, were formulated to maximize absorption in the atmospheric window while achieving some degree of selective emittance. The paste layer had an absorption peak of 99.9% within the atmospheric window; while the overall infrared emissivity between 6 to 10 μm was greater than 99.875%, where less than 0.125% of solar radiation is transmitted to substrate. Despite an absorption level over 99% and an absorption peak in the atmospheric window the paste layer didn't exhibit significant cooling properties because the absorption outside the window was still too high. When a $TiO_2$ ink layer was placed over the paste, selectivity increased by increasing reflectance outside the atmospheric window on both sides. The $TiO_2$ layer slightly reduced the absorption peak in the window. As observed in the thermal imagery and measurements by FLIR infrared radiometer/camera, the ink layer reduced surface temperature by an estimated 4° C. According to Wiley Spectrabase (2021) $TiO_2$ has its infrared absorption peak outside the atmospheric window at a wavelength of 20 μm or frequency of 500 cm-1 [14] which suggests a more spectrally selective nanoparticle ink layer on top of the paste could increase selectivity and cooling to a greater degree. Experiment results indicated the low-cost method of applying thin ink layers in thick film nanocomposites provide a feasible method for tuning and improving passive radiative cooling.

UV-Vis Spectroscopy

The UV-Vis spectroscopy was performed with an Ocean Optics USB-2000 UV-Vis-NIR spectrometer equipped with an enclosed steel chamber. Tuning films for high reflectance within 0.3-2.4 μm waveband are essential for daytime radiative cooling due to the strong solar heat flux during the day [26].

The absorbance of the cool roof coating in the was significantly more than the radiative cooling thick film nanocomposite. The strong ultraviolet light absorbance of cool roof coatings was due to white pigments such as titanium dioxide. Only 5% of the sun's radiation is in the ultraviolet radiation region of the electromagnetic spectrum, however, this 5% is where the photons are energetic enough to excite a typical atom from the ground state to ionization [20].

Tuning doped ZnO nanoparticles for the lowest absorbance in UV-Vis spectrum improves radiative cooling performance; however, the thickness of the medium and amount of nanoparticles also factors into reducing UV absorbance. The observed absorbance peak of ZnO was greatly reduced for Plate 4 and Plate 5 which had the same medium and volume fraction of nanoparticles, but the coating was ~20 μm thicker on Plate 5 which resulted in less UV absorbance.

Scanning Electron Microscope (SEM)

The SEM analysis of thick film samples were performed by a Hitachi 5800 or a Hitachi SU70 SEM. The thick film sample composition provides insight into size, morphology, and spacing of particles.

The SEMs of nanocomposite film surfaces in FIGS. 18A-18D revealed randomly distributed spectrally selective nanoparticles. Particles spacing of 5-10 μm apart with slight agglomeration is observed in FIGS. 18B-18C. Agglomeration occurred in coatings with randomly dispersed particles in a medium and applied by cost effective means. Because of this larger range of particle sizes and agglomeration absorption and reflectance was enhanced throughout the spectrum also in part because of the spectral selectivity of the materials. Nevertheless, both films exhibited spectrally selective properties, because of the spectral selectivity of the binder and nanoparticles.

The paste absorption reached over 99% in the atmospheric window, yet it didn't exhibit cooling properties. The SiO alone did not obtain radiative cooling but can be used as a filler if higher absorption is required.

Discussion

The thick film nanocomposites fabricated in this research were subjected to multiple performance measurement methods. All testing involved exposure of samples to direct sunlight. Direct sunlight can be classified as sunlight without filters between the object and sunlight. In other words, they were not placed inside an insulated chamber with a convection barrier. Also, the temperature readings were of the samples themselves and not of an enclosed air space below.

A side-by-side comparison of technologies is an insightful way to present any type of performance data. Exposure of the thick film nanocomposite coatings and cool roof coating on same aluminum substrate to the same environmental conditions proved to be a good method to gauge progress throughout this research. Disproportionate performance reporting resulting from nonstandard testing procedures is eliminated since both materials are tested under exact conditions.

Figure 12:
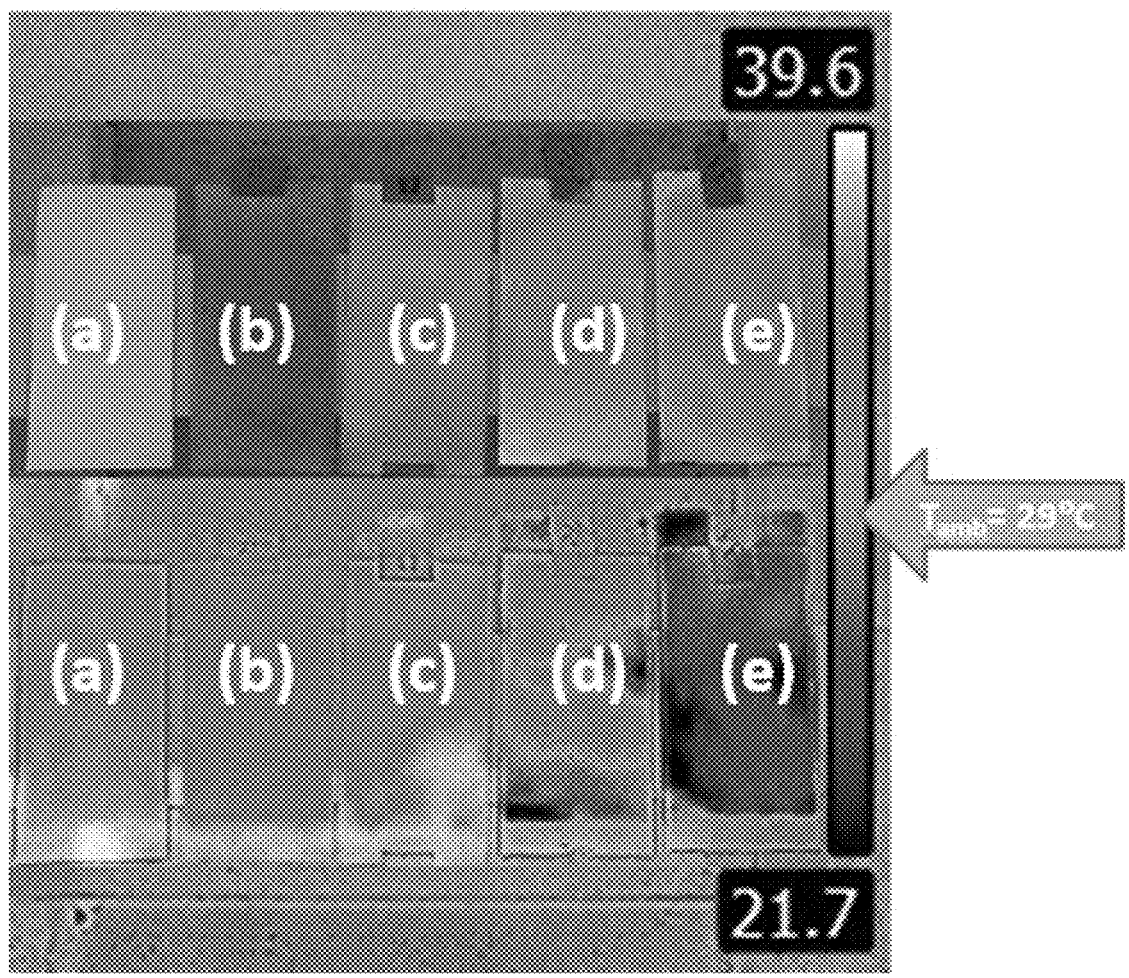
FIG. 12 shows an image of plates (top) and thermal imagery (bottom) with color temperature scale ambient temperature of 29° C. The lighter colors in thermal image are the hottest, while darker colors are the coolest. (a) Cool roof coating—440 μm thick paste layer, (b) Plate 21—47 μm thick w/5% RC 37; Spray w/siloxane mixture, (c) Plate 11—40 μm thick w/5% RC 39; Spray w/siloxane mixture, (d) Plate 24—58 μm thick w/5% RC 10; CSD w/siloxane mixture, (e) Plate 33—30 μm thick w/5% RC 44; Spray acrylic adhere particles.

Thermal images and photographs were obtained using a FLIR "forward looking infrared radiometer" E5 2.0L infrared camera. This method of testing provides a good option to compare and visualize infrared emittance from samples. Each pixel in image represented a surface temperature so one can assess the whole surface not just one point which is a limitation of thermocouple measurements. In FIG. 12 the scale to the right of image has white as the hottest temperature while purple is the coldest. A spectrally selective ink layer on aluminum substrate in direct sunlight exhibited greater cooling power than cool roof coating.

Ambient conditions for testing were 29° C., 78% humidity, and wind of 8 mph. The side by-side comparison of thick film nanocomposites to a cool roof coating on aluminum substrates in FIG. 12, provide a positive indication that the thick film's cooling power can be significantly higher than a cool roof coating. The samples on aluminum plates are a cool roof coating in (a)—a 440 µm thick paste layer. Nanoparticle and siloxane mixture sprayed on aluminum substrate for Plate 11 in (c)—47 µm thick w/5% particle #37 and Plate 21 in (b)—40 µm thick w/5% particle #39. While a chemical solution deposition of siloxane mixture for Plate 24 in (d)—58 µm thick w/5% particle #10. Application of nanoparticles adhered to acrylic binder surface for Plate 33 in (e) ~30 µm thick w/5% particle #44. Note that the lighter color on the bottom on (c) was feedback from the thermal camera. Nevertheless, the cool roof coating was above ambient temperature while the thick film nanocomposite ink layers whether in siloxane or acrylic paint were still below ambient. Also, this experiment demonstrated the ability to tune the emissivity of the thick film nanocomposite by varying medium and spectrally selective nanoparticles.

Infrared thermometers quickly measure the temperature for a point on an exposed material's surface. Thermal assessments of prepared samples were performed by EXTECH Instruments, Model 42515, Wide Range InfraRed (IR) Thermometer with a laser pointer. The highest average monthly solar radiation for the Florida testing location at Latitude 27.85° N, Longitude 82.78° W is 7.31 kWh/m$^2$/day for May, while the lowest in December is less than half with 3.34 kWh/m$^2$/day. Furthermore, the solar radiation intensity is highest during solar noon when the angle of incidence is 90 degrees. Measurements were also taken during the time of year and time of day when the highest solar radiation is incident upon a sample's surface. The surface temperature of the thick film nanocomposite (left) was 108.3° F. which is over 17° F. cooler than the cool roof coating (right) with a surface temperature of 125.4° F. A repeat of this experiment in December would record much lower surface temperatures.

Despite not posting surface temperatures below ambient temperatures the thick film nanocomposite and the cool roof coating still provided passive cooling to a greater degree than non-coated materials or standard roofing materials. ~60° F. hotter during day. On a day reaching 91° F. heat-absorbing materials like conventional roofing materials heat up ~150° F. [2]. Still both below 60° F. temperature increase of standard roofing materials Concentrating on daytime radiative cooling is important since many materials in city absorb a lot of radiation during the day, then retain this heat for a long time.

Thermal assessments of prepared samples were performed by an EXTECH Instruments, EasyView 11A, Type K Thermometer with a Type K thermocouples. An exposed sample with a Type K thermocouple affixed to the backside by Kapton tape consistently recorded temperatures below ambient during the majority of a 24-hour period; however, when tested during times when the greatest solar radiation was incident upon its surface the temperatures were above ambient yet not as high as infrared thermometer measurements. Once the angle of incidence upon the samples decreased the temperatures declined below ambient temperatures.

Figure 17:
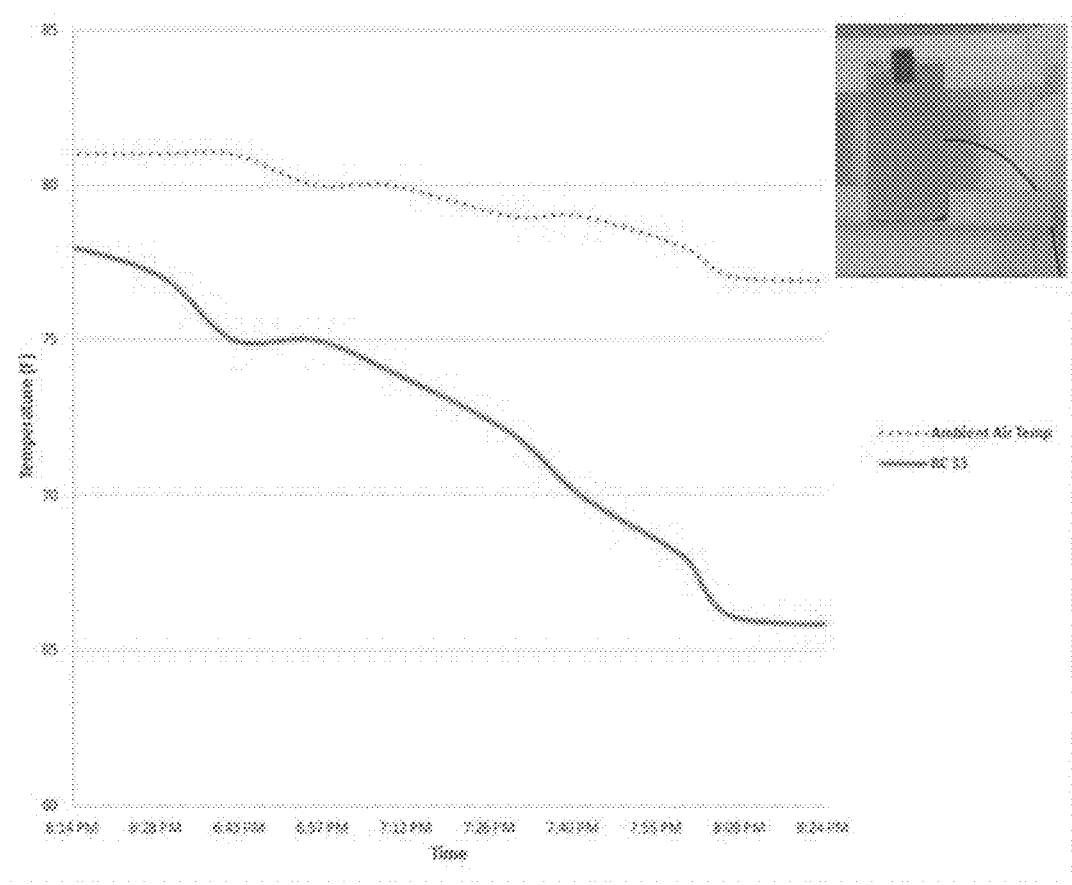
FIG. 17 shows UV-Vis spectrum of aluminum substrates with nanocomposite film coatings.
Figures 18A, 18B, 18C, 18D:
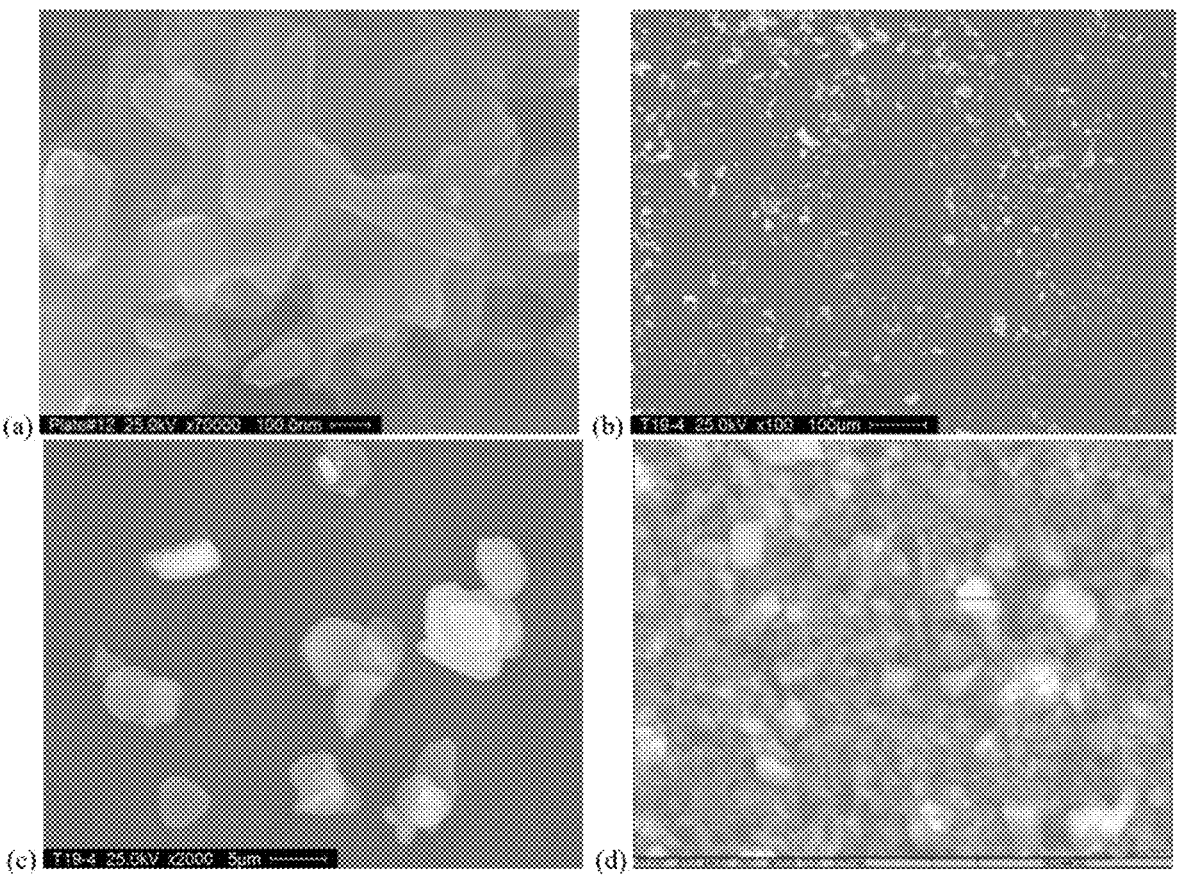
FIGS. 18A-18D show SEM micrographs of thick film nanocomposites.

Despite testing during the highest solar radiation of the year the exposed plate temperatures during the latter part of the day in FIG. 17 were ~4-11° F. below ambient temperatures. This cooling is attributed to the spectral selectivity of the thick film nanocomposite [67].

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus, a combination of steps, elements, components, or constituents can be explicitly mentioned herein; however, all other combinations of steps, elements, components, and constituents are included, even though not explicitly stated.

The following publications as listed below and throughout this document are hereby incorporated by reference in their entirety herein.

REFERENCES

[1] U.S. Department of Energy, 2021. Cool roofs are ready to save energy, cool urban heat islands, and help slow global warming. www1.eere.energy.gov/buildings/pdfs/cool_roof_fact_sheet.pdf (accessed 9/22/2021)

[2] Oke, R. T., 1997. Urban climate and global environmental change. Applied climatology, pp. 273-287.

[3] Al-Obaidi, K. M., M. Ismail, and A. M. Abdul Rahman, 2014. Passive cooling techniques through reflective and radiative roofs in tropical houses in Southeast Asia: A literature review. Frontiers of Architectural Research, 2014. 3(3): p. 283-297.

[4] Kolokotsa, D., Santamouris, M., and Akbari, H., 2013. Advances in the Development of Cool Materials for the Built Environment. SAIF Zone: Bentham Science Publishers.

[5] IPCC, 2021. IPCC: Climate Change 2021: The Physical Science Basis. Contribution of Working Group I to the Sixth Assessment Report of the Intergovernmental Panel on Climate Change [Masson-Delmotte, V., P. Zhai, A. Pirani, S. L. Connors, C. Péan, S. Berger, N. Caud, Y. Chen, L. Goldfarb, M. I. Gomis, M. Huang, K. Leitzell, E. Lonnoy, J. B. R. Matthews, T. K. Maycock, T. Waterfield, O. Yelekci, R. Yu and B. Zhou (eds.)]. Cambridge University Press. In Press.

[6] Oke. T. R. 1987. Boundary Layer Climates. New York, Routledge. Oke, T. R., 1987. Boundary layer climates, 2nd (ed.) Routledge. London and Wiley, New York.

[7] Catalanotti, S., Cuomo V., Piro, G., Ruggi, D., Silvestrini, V., Troise, G. 1975. The radiative cooling of selective surfaces. Solar Energy. 1975 May 1; 17(2):83-9.

[8] Hu, M., Pei, G., Li, L., Zheng, R., Li, J. and Ji, J., 2015. Theoretical and experimental study of spectral selectivity surface for both solar heating and radiative cooling. International journal of photoenergy, 2015.

[9] Lee, H. T., 2014. Climate Algorithm Theoretical Basis Document (C-ATBD): Outgoing Longwave Radiation (OLR)—Daily. NOAA's Climate Data Record (CDR) Program, psl.noaa.gov/data/gridded/data.olrcdr.interp.html (accessed 10/11/2021).

[10] Stephens, G. L., Li, J., Wild, M., Clayson, C. A., Loeb, N., Kato, S., L'Ecuyer, T., Stackhouse, P. W., Jr., Lebsock, M., and Andrews, T, 2012, An update on Earth's energy balance in light of the latest global observations. Nat. Geosci. 5, 691-696.

[11] Munday, J. N., 2019. Tackling Climate Change through Radiative Cooling. Joule. 3(9): p. 2057-2060.

[12] Grand View Research, 2020. Cool Roof Coatings Market Size, Share & Trends Analysis Report by End Use, by Product (Elastomeric, IR Reflective), By Application (Lowsloped, Steep-sloped), And Segment Forecasts, 2020-2027. www.grandviewresearch.com/industry-analysis/cool-roof-coating-market (accessed 9/22/2021)

[13] Firestone Building Products Company, LLC., 2021. Gaco a brand of firestone building products. gaco.com/documents/#sds (accessed 9/18/2021)

[14] Wiley, J., 2012, John Wiley & Sons, Inc. SpectraBase: spectrabase.com/spectrum/(accessed 9/18/2021)

[15] Raman, A. P., Anoma, M. A., Zhu, L., Rephaeli, E. and Fan, S., 2014. Passive radiative cooling below ambient air temperature under direct sunlight. Nature, 515(7528), pp. 540-544.

[16] Zeyghami, M., D. Y. Goswami, and E. Stefanakos, A review of clear sky radiative cooling developments and applications in renewable power systems and passive building cooling. Solar Energy Materials and Solar Cells, 2018. 178: p. 115-128.

[17] Nilsson, T. M. J. and G. A. Niklasson, 1995. Radiative cooling during the day: simulations and experiments on pigmented polyethylene cover foils. Solar Energy Materials and Solar Cells, 37(1), pp. 93-118.

[18] Gentle, A. R., and Smith, G. B., 2015. A subambient open roof surface under the mid-summer sun. Advanced Science, September 2(9), 1500119.

[19] Bao, H., Yan, C., Wang, B., Fang, X., Zhao, C. Y. and Ruan, X., 2017. Double-layer nanoparticle-based coatings for efficient terrestrial radiative cooling. Solar Energy Materials and Solar Cells, 168, pp. 78-84.

[20] Huang, Z., and Ruan, X., 2017. Nanoparticle embedded double-layer coating for daytime radiative cooling. International Journal of Heat and Mass Transfer 104: 890-896.

[21] Zhai, Y., Ma, Y., David, S. N., Zhao, D., Lou, R., Tan, G., Yang, R. and Yin, X., 2017. Scalable-manufactured randomized glass-polymer hybrid metamaterial for daytime radiative cooling. Science, 355(6329), pp. 1062-1066.

[22] Li, X., Peoples, J., Huang, Z., Zhao, Z., Qiu, J, Ruan, X. 2020. Full Daytime Sub-ambient Radiative Cooling with High Figure of Merit in Commercial-like Paints. doi:10.1016/j.xcrp.2020.100221

[23] Gonome, H., Baneshi, M., Okajima, J., Komiya, A., Yamada, N. and Maruyama, S., 2014. Control of thermal barrier performance by optimized nanoparticle size and experimental evaluation using a solar simulator. Journal of Quantitative Spectroscopy and Radiative Transfer, 149, pp. 81-89.

[24] Dobson, K. D., G. Hodes, and Y. Mastai, 2003. Thin semiconductor films for radiative cooling applications. Solar Energy Materials and Solar Cells, 80(3), pp. 283-296.

[25] Chae, D., Lim, H., So, S., Son, S., Ju, S., Kim, W., Rho, J. and Lee, H., 2021. Spectrally selective nanoparticle mixture coating for passive daytime radiative cooling. ACS Applied Materials & Interfaces, 13(18), pp. 21119-21126.

[26] Naghshine, B. B. and A. Saboonchi, 2018. Optimized thin film coatings for passive radiative cooling applications. Optics Communications, 410: p. 416-423.

[27] Lamba, R., Zeyghami, M., Young, D., Goswami, D. Y. and Kaushik, S. C., 2018, November. Thermal Modeling of a Building Integrated Radiative Cooler for Space Cooling Applications. In ASME International Mechanical Engineering Congress and Exposition (Vol. 52071, p. V06AT08A047). American Society of Mechanical Engineers.

[28] NASA. 2021. Solar Radiation. 29 Jul. 2021, earth.gsfc.nasa.gov/climate/research/solar-radiation/(accessed 10/11/2021)

[29] Zevenhoven, R. and Fält, M., 2018. Radiative cooling through the atmospheric window: A third, less intrusive geoengineering approach. Energy, 152, pp. 27-33.

[30] Kecebas, M. A., Menguc, M. P., Kosar, A. and Sendur, K., 2017. Passive radiative cooling design with broadband optical thin-film filters. Journal of Quantitative Spectroscopy and Radiative Transfer, 198, pp. 179-186.

[31] Li, D., Li, Y., Su, Y., Chi, C. and Huang, B., 2018. atmospheric-Window-Matching hierarchical Broadband infrared absorber realized by lithography-Free Fabrication. Frontiers in Energy Research, 6, p. 20.

[32] Goswami, D. Y. and Kreith, F. eds., 2015. Energy efficiency and renewable energy handbook. CRC press.

[33] Wijewardane, S. and D. Y. Goswami, A review on surface control of thermal radiation by paints and coatings for new energy applications. 2012, Elsevier Science B.V., Amsterdam.: Great Britain. p. 1863.

[34] Peoples, J., Li, X., Lv, Y., Qiu, J., Huang, Z. and Ruan, X., 2019. A strategy of hierarchical particle sizes in nanoparticle composite for enhancing solar reflection. International Journal of Heat and Mass Transfer, 131, pp. 487-494.

[35] Ling, Li, Rongkang Zhu, Yu Gu, and Zhi Chen. 2020. 'Doped semiconductor nanoparticles for possible daytime radiative cooling applications', Semiconductor Science and Technology, 35: 075018.

[36] Jackson, K. A. and Schroter, W. eds., 2000. Handbook of Semiconductor Technology, Volume 1: Electronic Structure and Properties of Semiconductors. Wiley-VCH.

[37] Lany, S., 2015. Semiconducting transition metal oxides. Journal of Physics: Condensed Matter, 27(28), p. 283203.

[38] Janotti, Anderson, and Chris G. Van de Walle. 2009. 'Fundamentals of zinc oxide as a semiconductor', Reports on Progress in Physics, 72: 126501.

[39] Liu X and Swihart M T 2014 Heavily-doped colloidal semiconductor and metal oxide nanocrystals: an emerging new class of plasmonic nanomaterials Chem. Soc. Rev. 43 3908-20

[40] Zhou, H., Wang, H., Zheng, K., Gu, Z., Wu, Z. and Tian, X., 2014. Aluminum-doped zinc oxide nanoparticles with tunable near-infrared absorption/reflectance by a simple solvothermal process. RSC Advances, 4(81), pp. 42758-42763.

[41] ASTM International. ASTM G173-03, Standard Tables for Reference Solar Spectral Irradiances: Direct Normal and Hemispherical on 37° Tilted Surface.

[42] Makarona, E., Athanassiou, B., Prionistis, C., Tegou, E. and Tsamis, C., 2015. A costefficient solution-based process for the development of ZnO nanostructures: a comprehensive study of the role of the seeding layer formation conditions. Procedia engineering, 120, pp. 447-450.

[43] Johnson, J. A., Heidenreich, J. J., Mantz, R. A., Baker, P. M. and Donley, M. S., 2003. A multiple-scattering model analysis of zinc oxide pigment for spacecraft thermal control coatings. Progress in organic coatings, 47(3-4), pp. 432-442.

[44] Turko, B. I., Kapustianyk, V. B., Rudyk, V. P. and Rudyk, Y. V., 2016. Thermal conductivity of zinc oxide micro- and nanocomposites.

[45] Gentle, A. R. and Smith, G. B., 2010. Radiative heat pumping from the earth using surface phonon resonant nanoparticles. Nano letters, 10(2), pp. 373-379.
[46] Wang, Z. L., 2004. Zinc oxide nanostructures: growth, properties, and applications. Journal of physics: condensed matter, 16(25), p. R829.
[47] Bharat, T. C., Mondal, S., Gupta, H. S., Singh, P. K. and Das, A. K., 2019. Synthesis of doped zinc oxide nanoparticles: a review. Materials Today: Proceedings, 11, pp. 767-775.
[48] Bish, D L and Post, J E, editors. 1989. Modern Powder Diffraction. Reviews in Mienralogy, v. 20. Mineralogical Society of America.
[49] Cullity, B. D. 1978. Elements of X-ray diffraction. 2nd ed. Addison-Wesley, Reading, Mass.
[50] Klug, H. P., and L. E. Alexander. 1974. X-ray diffraction procedures for polycrystalline and amorphous materials. 2nd ed. Wiley, New York.
[51] Patterson, A. L., 1939. The Scherrer formula for X-ray particle size determination. Physical review, 56(10), p. 978.
[52] Smith, B., 1999. Infrared Spectral Interpretation. CRC Press, New York, USA.
[53] Coates, J., 2000. Interpretation of infrared spectra, a practical approach. Encyclopedia of Analytical Chemistry pp. 10815-10837, John Wiley & Sons.
[54] Stuart, B. H., 2004. Infrared spectroscopy: fundamentals and applications. John Wiley & Sons.
[55] Nakamoto, K., 2009. Infrared and Raman spectra of inorganic and coordination compounds, part B: applications in coordination, organometallic, and bioinorganic chemistry. John Wiley & Sons.
[56] Chen, Z., Zhu, L., Raman, A. and Fan, S., 2016. Radiative cooling to deep sub-freezing temperatures through a 24-h day-night cycle. Nature communications, 7(1), pp. 1-5.
[57] Jianguo, D. A. I., Xiao, X. U. E., Dangyuan, L. E. I., Meng, Q. I. U. and Jin, W., Hong Kong Polytechnic University HKPU, 2021. Coating with smart sub-ambient radiative cooling. U.S. patent application Ser. No. 16/949, 417.
[58] Silvestrini, V., Peraldo, M. and Monza, E., Montedison SpA, 1982. Covering Element screening off the solar radiation for the applications in the refrigeration by radiation. U.S. Pat. No. 4,323,619.
[59] Mandal, J., Fu, Y., Overvig, A. C., Jia, M., Sun, K., Shi, N. N., Zhou, H., Xiao, X., Yu, N. and Yang, Y., 2018. Hierarchically porous polymer coatings for highly efficient passive daytime radiative cooling. Science, 362 (6412), pp. 315-319.
[60] Bhatia, B., Leroy, A., Shen, Y., Zhao, L., Gianello, M., Li, D., Gu, T., Hu, J., Soljačić, M. and Wang, E. N., 2018. Passive directional sub-ambient daytime radiative cooling. Nature communications, 9(1), pp. 1-8.
[61] Zhu, L., Raman, A. P. and Fan, S., 2015. Radiative cooling of solar absorbers using a visibly transparent photonic crystal thermal blackbody. Proceedings of the national academy of sciences, 112(40), pp. 12282-12287.
[62] Mingke, Hu, Pei Gang, Li Lei, Zheng Renchun, Li Junfei, and Ji Jie. 2015. 'Theoretical and Experimental Study of Spectral Selectivity Surface for Both Solar Heating and Radiative Cooling', International Journal of Photoenergy, 2015.
[63] Zhao, B., Hu, M., Ao, X., Xuan, Q. and Pei, G., 2018. Comprehensive photonic approach for diurnal photovoltaic and nocturnal radiative cooling. Solar Energy Materials and Solar Cells, 178, pp. 266-272.
[64] Granqvist, C. G. and A. Hjortsberg, Radiative cooling to low temperatures: General considerations and application to selectively emitting SiO films. Journal of Applied Physics, 1981. 52(6): p. 4205.
[65] Nilsson, T. M. and Niklasson, G. A., 1995. Radiative cooling during the day: simulations and experiments on pigmented polyethylene cover foils. Solar energy materials and solar cells, 37(1), pp. 93-118.
[66] Muselli, M., 2010. Passive cooling for air-conditioning energy savings with new radiative low-cost coatings. Energy and Buildings, 42(6), pp. 945-954.
[67] Young, David Allen, "Passive Radiative Cooling by Spectrally Selective Nanoparticles in Thick Film Nanocomposites" (2022). USF Tampa Graduate Theses and Dissertations. digitalcommons.usf.edu/etd/9506

What is claimed is:

1. A method for forming spectrally selective nanoparticles, the method comprising:
heating a growth solution comprising a zinc salt precursor comprising one or more zinc salts, zinc oxide seed particles, and two or more dopants and wherein the two or more dopants comprise $Si_3N_4$ and $SiO_2$ in a non-pressurized hydrothermal reactor to a first temperature under agitative conditions for a reaction period;
cooling the reactor to a second temperature less than the first temperature for a cooling period to form a precipitate of recrystallized doped zinc oxide nanoparticles dispersed in a suspension; and
separating and collecting the recrystallized nanoparticles from the suspension, wherein the collected nanoparticles exhibit a spectral selectivity in the atmospheric window.

2. The method of claim 1, wherein the one or more zinc salts comprise zinc acetate, zinc nitrate hexahydrate, or a combination thereof.

3. The method of claim 1, wherein the zinc oxide seed particles comprise doped zinc oxide nanoparticles.

4. The method of claim 1, wherein the nanoparticles are substantially polydisperse, substantially polymorphic, and/or substantially polycrystalline.

5. The method of claim 1, wherein the step of separating and collecting the doped zinc oxide nanoparticles comprises decanting the solution, washing the precipitated doped zinc oxide nanoparticles at least once, and substantially drying the doped zinc oxide nanoparticles.

6. The method of claim 1, wherein the zinc oxide seed particles are continually suspended in the growth solution for substantially the entire reaction period.

* * * * *